United States Patent [19]
Drunk et al.

[11] Patent Number: 5,377,106
[45] Date of Patent: Dec. 27, 1994

[54] PROCESS FOR NAVIGATING AN UNMANNED VEHICLE AND A VEHICLE FOR THE SAME

[75] Inventors: Gerhard Drunk; Achim Langen; Stefan Forster; Christoph Hug; Joachim Müllerschön, all of Stuttgart, Germany

[73] Assignee: Fraunhofer Gesellschaft zur Foerderung der angewandten Forschung e.V., Germany

[21] Appl. No.: 913,790

[22] Filed: Jun. 23, 1992

Related U.S. Application Data

[63] Continuation of Ser. No. 765,490, Sep. 26, 1991, abandoned, which is a continuation of Ser. No. 415,319, Sep. 22, 1989, abandoned.

[30] Foreign Application Priority Data

Mar. 24, 1987 [NL] Netherlands ............... 3709627

[51] Int. Cl.$^5$ ............................................. G06F 15/50
[52] U.S. Cl. .................. 364/424.02; 318/587; 180/169
[58] Field of Search .............. 364/424.02, 424.01; 318/587; 180/167, 168, 169

[56] References Cited

U.S. PATENT DOCUMENTS

| | | | |
|---|---|---|---|
| 4,500,970 | 2/1985 | Daemmer | 364/444 |
| 4,700,427 | 10/1987 | Knepper | 180/169 |
| 4,751,658 | 6/1988 | Kadonoff et al. | 180/168 |
| 4,796,198 | 1/1989 | Boultinghouse et al. | 364/424.02 |
| 4,818,107 | 4/1989 | One et al. | 340/988 |
| 4,846,297 | 7/1989 | Field et al. | 364/424.02 |
| 4,876,444 | 10/1989 | Field | 180/169 |
| 4,878,003 | 10/1989 | Knepper | 180/168 |

FOREIGN PATENT DOCUMENTS 0193985  5/1985  European Pat. Off. .
0142594  9/1986  European Pat. Off. .

*Primary Examiner*—Gary Chin
*Attorney, Agent, or Firm*—Evenson, McKeown, Edwards & Lenahan

[57] ABSTRACT

Disclosed is a process for navigating an unmanned vehicle over a predeterminable course, respectively such a vehicle. A steering and control unit determines by a first sensor at least the stretch covered and detects by at least one second sensor objects in the vicinage the position of which is stored in the steering and control unit and which serve the purpose of checking the position of the vehicle computed on the basis of the covered stretch. In accordance with the present invention the distance of the vehicle from the objects in the vicinage stored with their exact position in relation to the planned path in the steering and control unit is ascertained by the second sensor at points on the path spaced at intervals. The ascertained distance is compared with the stored distance of the planned coordinates of the point on the path from the object in vicinage.

32 Claims, 20 Drawing Sheets

PROCESS FOR NAVIGATING AN UNMANNED VEHICLE AND A VEHICLE FOR THE SAME

This is a continuation of application Ser. No. 07/765,490, filed Sep. 26, 1991, now abandoned, which is a continuation of application Ser. No. 07/415,319, filed Sep. 22, 1989, now abandoned.

FIELD OF THE INVENTION

The present invention relates to a process of navigating an unmanned vehicle and to such a vehicle.

BACKGROUND OF THE INVENTION

A process for navigating an unmanned vehicle as well as such an unmanned vehicle is known, by way of illustration, from European Patent Document EP 0 193 985 A1. In this state of the art unmanned vehicle, and the process for navigating the same, a first sensor determines the path covered by the vehicle. The "rough" present position of the vehicle is ascertained by the output signals of the aforementioned sensor. At least one other sensor, which identifies the pattern indicated on the floor, is provided to check this position determination, whereby the determined actual/planned position of the vehicle is assigned to a specific pattern respectively.

The state of the art vehicle, and the process therefor, have a number of disadvantages.

One grave disadvantage to be pointed out is that specific patterns must be indicated on the floor of the area in which the vehicle moves. These patterns usually have to be indicated on the floor at some later date, so that the vehicle cannot be put to use with a minimum of effort in a "completely new setting". Moreover, the vehicle must "drive over" the patterns on the basis of which it checks its position. If there are relatively big deviations in position—by way of illustration when wheel slippage is too great—the vehicle does not detect a pattern at the presumed planned position and, therefore, is "helpless" in determining the position. Usually, as a consequence, the vehicle switches itself off and has to be repositioned by an operator.

Another disadvantage is that all the markings are identical. One strip or pattern cannot be distinguished from another. If a grid is not detected or if there are considerable deviations in position, errors in navigating can occur as a consequence.

There are, however, other reasons why identifying such patterns indicated on the floor may present problems: inevitably, extant dirt, etc. may cover or alter such patterns, which can be an extreme nuisance if the unmanned vehicle is employed as a cleaning vehicle, by way of illustration, shampooing the floor in one operation and giving it further treatment in another as pattern detection through the foam on the floor from the shampooing operation usually becomes impossible.

For this reason, Japanese patent applications 58-200360 and 58-201652 propose a cleaning vehicle that first gathers information on the peripheral area of the surface to be cleaned and begins a to-and-fro motion to clean the floor on the basis of this information. This occurs, by way of illustration, in such a manner that the device first drives along the entire outer region of the area and in this way stores the detected data in order to then, beginning on one side of the area, drive meanderingly to and fro within it, so that immediately adjacent, under certain circumstances, minimally overlapping strips of area can be cleaned consecutively.

This manner of navigating a cleaning vehicle often results in errors, because, due to unavoidable exterior influences, the driven wheel or wheels may demonstrate non-uniform slippage behavior caused by varying surface structure of the floor and small uncontrolled deviations from the course may occur due to ambient influences and, under certain circumstances, to powers produced by the cleaning aggregate. Thus, it can happen that the cleaning vehicle drives beyond the determined boundary of the area or does not quite reach the edge of the area and/or the parallel paths of the to-and-fro motion are not adjacent and/or parallel enough to each other to provide a continuous, cleaned surface. Moreover, the deviations from the path arising with the afore-described state of the art vehicle present a potential safety hazard to the operator.

An unmanned vehicle is also previously known (SPIE Vol. 521 Intelligent Robots and Computer Vision (1984), pp. 62-73), in which a lawnmower is equipped with a camera producing images of the surrounding area during operation. These images are digitized yielding in this manner navigational data.

A navigational system of this type is extremely complex and costly in construction and requires large storage and computation capacities. If these are not available or cannot be accommodated in a compact vehicle, by way of illustration a cleaning vehicle, the result is a very slow driving and operating speed accompanied by distinct economic disadvantages for the operator.

Furthermore, from DE 31 13 086 A1 it is known how to navigate by having the vehicle measure its distance by means of retroreflectors attached to walls of the room. However, this prior art manner of navigating has a number of disadvantages:

Firstly, it is necessary that the vehicle be built so high that it has "eye contact" with the retroreflectors attached to the walls of the factory hall over the objects in the hall. Secondly—and this is the major drawback of this state of the art navigating process—constant measuring and assessing the distance is necessary. Otherwise in a hall of regular shape, by way of illustration with a square floor plan, the measured values cannot be unequivocally assigned to the various retroreflectors attached to the walls of the hall, insofar as the vehicle cannot ascertain the distance to three walls simultaneously, which usually is, however, not possible with typical factory hall configurations.

Thus, the above described state of the art vehicle requires a great amount of computation which consequently led to the concept in this publication to leave the navigation of the vehicle to a stationary computer to which the signals from the sensors are transmitted telemetrically.

SUMMARY OF THE INVENTION

The object of the present invention is to provide a process for navigating an unmanned vehicle, and such a vehicle that, at comparatively little expense and effort, is flexible and can be run exactly over a variable course without requiring special provisions along this course and without requiring very complex construction and/or extensive computation.

A solution to the above-mentioned object and its further embodiments in accordance with the present invention is set forth in the claims hereto.

Strikingly, the object of the present invention can be solved by proceeding on the basis of a process for navigating an unmanned vehicle and further improving the aforementioned vehicle in such a manner that the second sensor, of which each vehicle has at least one, is a distance-measuring sensor, which ascertains, at specific points of the freely predeterminable course, the distance of the vehicle from significant objects in the vicinage stored in the steering and control unit in their exact positions in relation to the planned path. The coordinates of the aforementioned significant objects in the vicinage such as, by way of illustration, free-standing wall elements, even siding surfaces of machines or steering and control cabinets, round posts or the like, are stored in the steering and control unit of the vehicle: this means that the surrounding area only has to be partially known. The ascertained distance is compared with the stored distance of the planned coordinates for the point on the path from the object in the vicinage in order to check the adherence of the vehicle to the path (position and alignment).

Thus, the unmanned vehicle will first proceed in a known manner along a predetermined planned path, deviations from the navigated course, as explained in the foregoing, being inevitable. In order to eliminate these deviations to a large extent and, in particular, to prevent small deviations from the course from adding up to large deviations in accordance with the present invention, the exact position (actual position) of the vehicle is determined at points spaced at intervals on the path in that the position of the vehicle is ascertained in relation to the known object in the vicinage by means of a second sensor in order to subsequently compare the actual position with the planned position. If the comparison reveals a difference, i.e. the vehicle is not at the position on the planned path it should have reached in accordance with the steered angles and revolutions made by at least one wheel and/or is not in alignment with the course of the planned path, a correction is made accordingly.

The invented unmanned vehicle offers a number of advantages.

The course to be navigated by the vehicle is not fixed by guide wires laid into the floor or by active or passive markings attached to the building. For this reason, the course of the vehicle can be changed at any time without requiring construction measures and, consequently, without interfering with running operations. By way of illustration, an altered course can be interactively fixed at any time in an off-line programming system, in which the ambience of the factory hall, and the significant points of this environment are stored. Such an altered course can be transmitted to the vehicle while it is driving, by way of example, at a stop or also by means of an infrared sensor or the like, the vehicle then immediately navigating a new route. However, the vehicle of the present invention is substantially lower in cost than the state-of-the-art systems driving with similar precision as no guide wires or complicated and above all no rapid image-processing equipment are required, just simple distance-measuring sensors. Thus, it is substantially more exact in steering toward its destination than comparable elaborate systems, in which only the covered stretch is determined by means of "integration".

As provided in certain embodiments of the invention, all the surfaces and/or objects present in any area to be driven in are utilized as objects in the vicinage, therefore, in general they are not objects in the vicinage attached or placed especially for this purpose.

Thus, the invented process can be conducted with a minimum of cost and effort as it, as stated, requires for path correction only that the distance be measured in the vicinty of stored, significant objects in the vicinage and that the determined actual distance be compared to the stored planned distance.

If it is discovered in measuring the distance that the ascertained actual coordinate does not lie on the stored planned path and/or the alignment of the vehicle deviates from the direction of the planned path at this site, the steering and control unit steers at least one of the wheels of the vehicle in such a manner that a corrective movement of the vehicle takes place by means of which it is once again returned to the planned path, and aligned to it.

However, it can happen that it is discovered when comparing the ascertained actual coordinate to the planned coordinate that the vehicle is in correct alignment on the planned path, but either has not yet reached the planned coordinate or has already passed it. In this case, the steering and control unit only has to correct the planned coordinate of the vehicle determined by it on the basis of the previous steering in such a manner that it coincides with the ascertained actual coordinate, i.e. no corrective movement of the vehicle is required, but rather the vehicle continues to be navigated along the stored planned path working on the basis of the ascertained actual coordinate.

Finally, the vehicle may have deviated from the planned path to such an extent that it can no longer return to it on its own or, by way of illustration, only by not cleaning an unduly large region of the surface or by leaving out a production station. In such a case, the vehicle is stopped and an operator that is summoned by an optical or acoustical signal can make corrections.

Furthermore, the present invention relates to an unmanned vehicle having at least three wheels, which can be moved along a predeterminable planned path by means of a steering and control unit steering the angle and revolution of at least one wheel. In addition, the present vehicle is distinguished by having the positions of significant objects in the vicinage and their assigned coordinates on the planned path stored in the steering and control unit, by having, upon detection of having reached such a coordinate on the planned path, the steering and control unit ascertain the distance of the vehicle from an object or objects in the vicinage assigned to this coordinate on the planned path by means of a second sensor and the actual position of the vehicle determined on the basis of the gained data and by having the steering and control unit compare the actual position to the planned position given by the coordinates on the planned path and conduct corrective measures if there is a deviation.

Thus, the invented vehicle is constructed in such a way that it may be navigated in the manner described in connection with the invented process in the foregoing section. In this case, the steering and control unit activates at least one wheel in order to execute a corrective movement when the determined actual position does not lie on the planned path and/or the alignment of the vehicle deviates from the planned path, whereas when the vehicle is correctly aligned and the actual position lies on the planned path, the steering and control unit alters the planned path coordinates corresponding to the determined actual position.

It is particularly advantageous if the steering and control unit checks the coordinates on the planned path at least at some sites where the direction of the course of the planned path changes in order to be able to combine in this manner a corrective movement with the change in direction in accordance with the planned path.

Virtually any sensors already extant for vehicle control can be used as first sensors. Similarly optical sensors can be employed as second sensors.

As is customary in unmanned vehicles, the motion of at least one wheel can be monitored and signals characterizing these movements can be transmitted to the steering and control unit, for example, by having at least one wheel coupled with an impulse generator, which produces the characterizing signals. In this way, the steering and control unit receives feedback on the wheel movements it has generated and can compare if the desired wheel movements coincide with the ascertained wheel movements, the thus determined path then is the planned path. Naturally, if the vehicle is designed accordingly, signals, by way of illustration, characterizing the revolution of the engine driven by the steering and control unit, can be drawn upon as output signals of the first sensor in accordance with the present invention.

Moreover, it is known (e.g. German Patent Document DE-OS 31 37 745, PCT Document PCT/WO 85/00229) to utilize ultrasonic sensors for measuring distances and in the case of the invented vehicle at least one second sensor may be an ultrasonic sensor.

For ascertaining the actual position of the vehicle in relation to an object in the vicinage, respectively in relation to several objects in the vicinage, there are preferably at least three ultrasonic sensors, of which one measures the distance of the vehicle from an object in the vicinage in the direction of the longitudinal axis of the vehicle and the two others are shifted in the direction of the longitudinal axis of the vehicle measuring on the same side the distances from an object in the vicinage in direction of the transverse axis of the vehicle.

In this manner, distances for objects in the vicinage in the area, the position of which in reference to a planned coordinate are stored in the steering and control unit are ascertained in two coordinate directions in such a way that the actual position of the vehicle can be determined. As, in addition, laterally, two spaced sensors and, in particular, ultrasonic sensors conduct distance measurements, the angular position of the vehicle in relation to the respective object in the vicinage can be ascertained in this manner and thus in relation to the stored planned path.

Furthermore, at least one ultrasonic sensor can be provided beaming the ultra-sound upward in such a way that objects in the vicinage, whose position is known on the ceiling of a room, for example protruding lamps, can be deducted from the travel time of the reflected sound energy, thereby giving the position of the vehicle in relation to these known objects in the vicinage.

During the operation of an unmanned vehicle it can, of course, occur that there are obstacles in the region to be travelled or closely adjacent thereto, which were not there when the planned path was stored or that persons or other obstacles enter the region of the path of the vehicle during operation. In order to prevent the vehicle from colliding with the obstacle in such cases, the vehicle can be provided with several obstacle sensors, which can, depending on their design and circuitry, make the vehicle circumvent the obstacle, thus interfering with normal navigation, or stop the vehicle.

Obstacles may also, by way of illustration, take the shape of steps down which the vehicle might fall. For this reason, it is advantageous if drop monitoring sensors aimed in a vertical direction detecting increases in the distance between their position and that of the floor travelled on by the vehicle, indicating a step, are provided on a circular arc on the front part of the vehicle and stop the vehicle. As the drop monitoring sensors have to detect changes in distance at a relatively minimal distance from the vehicle, infrared sensors are preferably used for this purpose.

In order to monitor the region in front of the vehicle for obstacles, preferably ultrasonic obstacle sensors, the sound beam lobes of which being shaped by means of sound channels in front in such a manner that at least one sound field completely covering the area to be monitored is formed, may be provided on the front and on the lateral front part of the vehicle.

By using sound channels, which are state of the art (U.S. Pat. No. 4,516,229; German Patent Document DE-OS 31 37 745), it is possible to shape the sound beam lobes of ultrasonic sensors in such a manner that the desired coverage is yielded, whereby on the one hand standard ultrasonic sensors can be employed and on the other hand only a few such sensors are required for total monitoring.

In order to detect obstacles appearing in front of the vehicle, three ultrasonic obstacle sensors may be provided producing a sound field which is symmetrical to a horizontal plane and stretches in the same manner above and below the plane completely covering an area to be monitored in such a way that objects appearing relatively far ahead of the vehicle can be identified by their position and distance and steering signals can be released accordingly.

In order to detect relatively low obstacles ahead of the vehicle in time, for example door stoppers, three ultrasonic obstacle sensors may be provided producing a sound field aimed diagonally ahead and down completely covering an area to be monitored.

If the vehicle is driven along a wall, a collision can occur due to deviation from the planned path or due to obstacles not previously there. In order to prevent such a collision, two optical obstacle sensors may be provided in the vicinity of a lateral front edge of the vehicle, one beaming ahead at an angle of 10° to 30° in relation to the longitudinal axis of the vehicle and thereby effecting detection in the distance and the other one beaming ahead at an angle of 50° to 70° in relation to the longitudinal axis of the vehicle, thereby permitting detection of obstacles suddenly appearing near the vehicle and releasing an emergency braking.

The invented vehicle may be utilized, by way of illustration, as a cleaning vehicle, as a truck, as a surveillance vehicle for military and/or security purposes, as an inspection vehicle at dangerous sites, by way of illustration in nuclear reactors, as sensor-bearing vehicle, by way of illustration, measuring air pollution, etc., at different locations.

If used as a cleaning vehicle, it can be provided with a cleaning brush above which a vacuum device may be arranged in order to vacuum off the dirt particles collected from the floor by the brush.

By means of an embodiment of the invented vehicle, great adherence to the path is attained, which quite suffices for driving along a course of an unmanned vehicle. Depending on the construction of the sound beam lobes of the sensors, positioning precision may, however, not be sufficient for "docking" at a station for, by way of illustration, transferring loads or refilling detergents. At such load transfer stations, typically positioning with a precision of ±2 mm in the travelling direction, ±1 mm at a spaced interval from the station and an angle of ±0.5° between the longitudinal axis of the vehicle and the docking station is required.

In order to ensure such high positioning precision under all circumstances, it is an element of the present invention that at least one third sensor is provided, from the output signal of which the steering and control unit ascertains the position of the vehicle in relation to a stopping station.

Preferably, the above-mentioned third sensor is an optical spacing sensor, which detects the location of a rectangular edge of a plane surface in short intervals in order to determine the position of the vehicle in relation to a stopping station. Usually the measured values of the third sensor and the internal vehicle position data are stored while the vehicle passes the afore-described reference edge. The steering and control unit recognizes when this edge has been passed and begins the computation of the relative position. For this purpose, the internally recorded vehicle position data are combined with the distance-measured values (position in the travelling direction and the corresponding measured value). The tipping, respectively the angle, of the vehicle may be readily computed from two consecutive measured values or following at specific intervals in accordance with the known principles of trigonometry. The position on the travelling axis where the measuring beam of the optical sensor has run over the reference edge yields the point where the sensor distinctly has identified the corner (transition of the sensor signal to a distance in proportion to the travel distance) less the "off-set value", which takes the width of the measuring beam and the distance from the vehicle into consideration.

In this case, preferably one distance measurement is made per millimeter of travel motion, i.e. when travelling at a velocity of 0.1 m/s 100 measurements/s have to be made. Furthermore, the vehicle has to move past the reference edge on an absolutely straight path.

Thus, the invented vehicle permits flexible travelling on changing courses, whereby it is particularly advantageous if the corresponding methods are also followed when programming the steering and control unit designed in accordance with the present invention.

For this purpose, the programming of the course to be adhered to occurs by means of so-called "teaching", i.e. the vehicle learns by driving over the course with an operator steering it manually. At the same time, the environs in which the vehicle is to move is entered interactively supported with graphics into a personal computer which automatically generates the steering and control software for the altered ambience of the room.

In off-line programming, the floor plan of the room with the position of the stations, reference surfaces, the desired paths and obstacle surfaces are entered interactively at a graphic station by means of a menu. The appropriate drive programs between the stations are subsequently generated automatically.

DETAILED DESCRIPTION OF THE DRAWINGS

Figure 6:
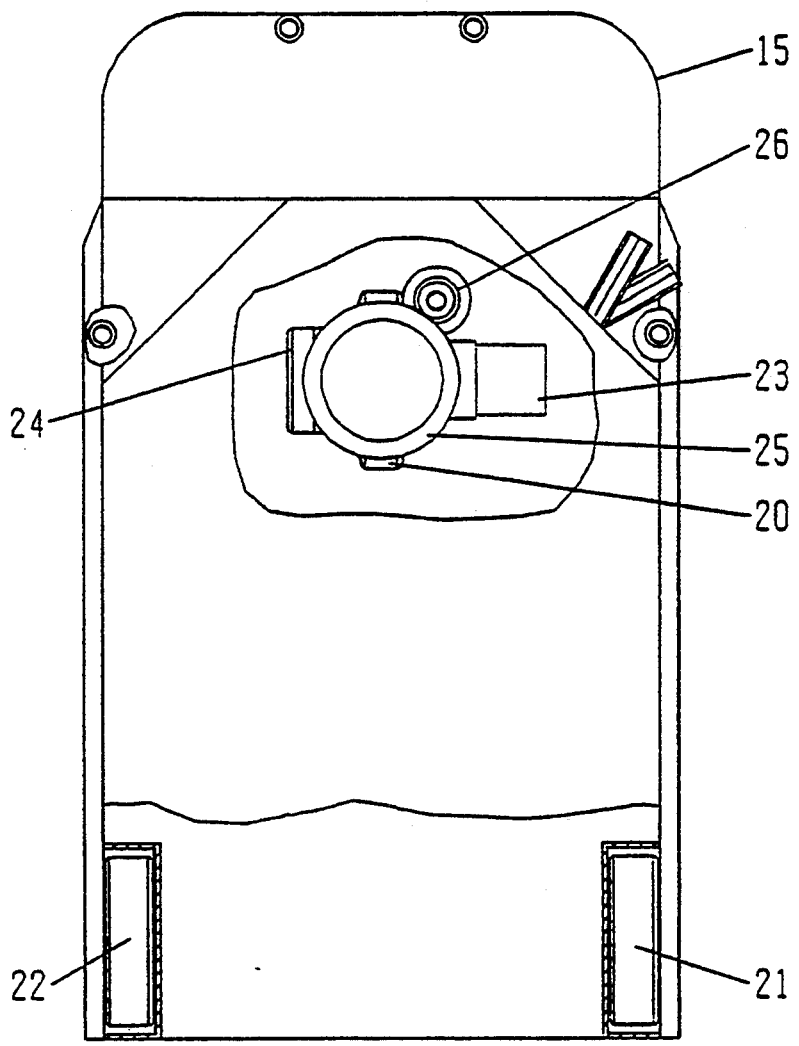
FIG. 6 depicts in a diagrammatic top view the position of the wheels and of the sensors of FIG. 5 in, or on, a housing.

The illustrated cleaning vehicle 1 has a frame, not depicted, on which a housing, having a front wall 2, two side walls, of which only side wall 3 is designated, and a rear wall 4, is arranged and having a ceiling 5 on top. In the region of the front wall 2, pronounced connecting walls 6, 7 run diagonally to the side walls. At the rear end of the housing two wheels 21, 22 are held in place in such a manner that they can freely rotate about their axes, of which the axis 28 of wheel 21 can be seen in FIG. 8. In the center of the front end of the cleaning vehicle 1, a wheel 20 is supported in bearings in a manner not illustrated, on the axis of which is located a direct current engine 24 (FIG. 6). On the side opposite the direct current engine 24, an angular momentum generator 23 conventional for trucks, which might be, by way of illustration, an angular momentum generator of the type 6069001024 from Hohner Elektrotechnik KG, 7200 Tuttlingen, is attached to the axis of the wheel 20. The afore-mentioned wheel 20 is supported in bearings in such a way that it can rotate about a vertical axis and the mounting provided for this has on its upper end a toothed ring 25, the pronounced teeth on the outer circumference of which interact in a combing manner with gear wheel 27, which is situated on the armature shaft of an electric engine 26.

With an arrangement of this type, the wheel 20 can be activated by means of direct current engine 24 in such a way that wheel 20 rotates about its own axis, whereby the angular momentum generator 23 produces signals characterizing the angle of rotation. For steerage, engine 26 can be activated, which turns the toothed ring 25 by means of gear wheel 27 attached to its armature shaft, thereby turning wheel 20 for executing steering movements about a vertical axis, whereby the angle of rotation is controlled, in a manner customary in such cases, by means of a potentiometer attached to the vertical axis of rotation, the angle of which is determined via its stationary measurement in that the yielded changes in potentiometer resistance of the potentiometer are measured.

It is noted that rechargable batteries 31 (FIG. 8) are accommodated in the housing of cleaning vehicle 1, which supply the electric energy for the entire operation and, thus, also for activating the direct current engine 24 and electric engine 26.

Figure 8:
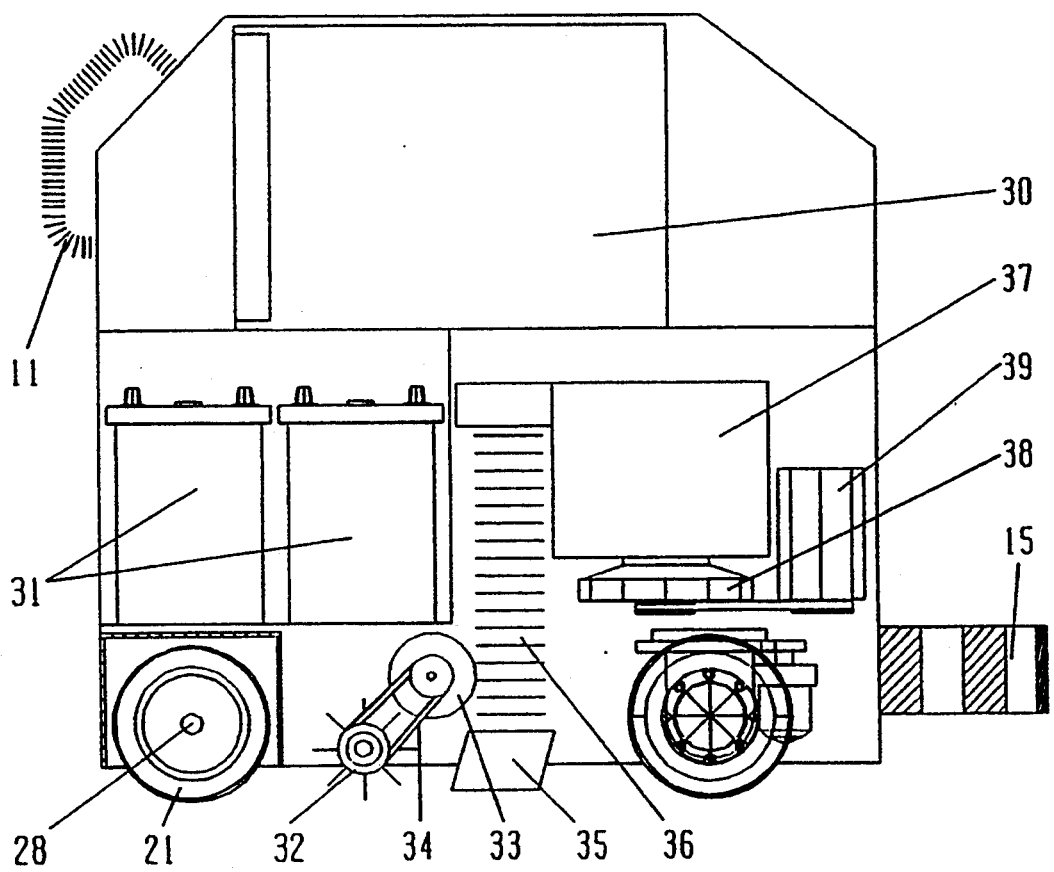
FIG. 8 depicts a diagrammatic lateral view of the cleaning vehicle, the side wall being broken away, permitting identification of the diagrammatic and greatly simplified individual parts.
Figure 9:
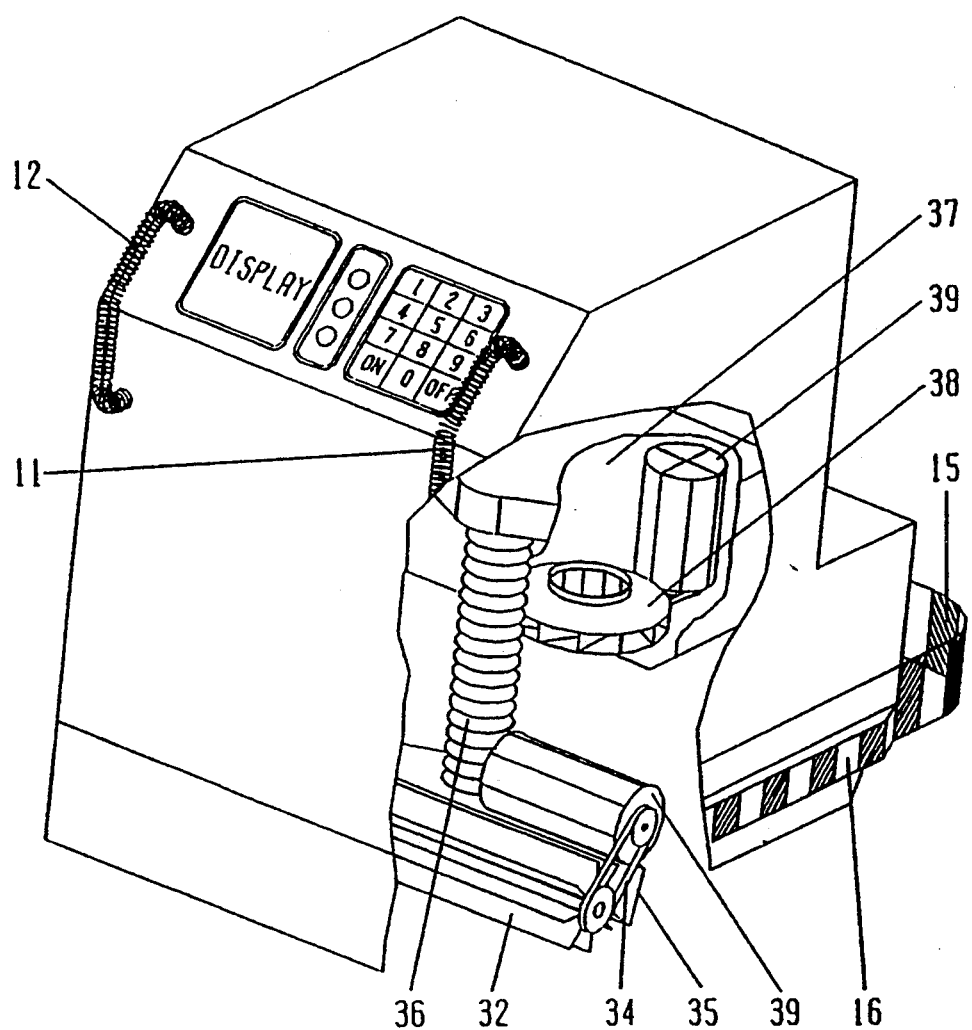
FIG. 9 depicts a sectional view in perspective of the housing, which is partially open, in order that parts of the cleaning vehicle can be seen, whereby other parts have been omitted.

In order to move the above described cleaning vehicle 1 along a predetermined path, a route is stored in the only diagrammatically illustrated steering and control unit 30 FIG. 8) as is usual for certain types of unmanned vehicles. This route can be entered by the operator via a control panel and has, as is usual for cleaning vehicles, a meandering course covering the entire surface to be cleaned, with the adjacent paths of the meandering course lying so close together that the entire surface is cleaned without interruption. The data on the stored path, the so-called planned path, supply the information according to which direct current engine 24 rotates wheel 20 and electric engine 26 produces the steered angle of wheel 20 in the above described manner, whereby the angular momentum generator 23 and the potentiometer, which is to be changed by the steered angles, return electric signals to the steering and control unit 30 in order to effect feedback on the executed navigational commands given by the steering and control unit 30 in the manner customary for trucks.

When the cleaning vehicle 1 moves along the planned path, deviations occur for various reasons between the route of cleaning vehicle 1 and the planned path. Thus, it can happen, by way of illustration, that the driven wheel 20 executes its rotations with a certain, unforeseen slippage causing the angular momentum generator 23 to produce feedback signals for the steering and control unit 30 indicting the turning movement directly produced by steering and control unit 30, whereby cleaning vehicle 1 actually has covered a shorter stretch due to the slippage of wheel 20. Accordingly, unintentional shifts in direction of wheel 20 during operation can result in deviation from the planned path. Quite substantial in such steerage along a planned path, however, are also deviations due to unavailable tolerances so that just minimal deviations over a long stretch can develop into a major deviation.

In order to continuously return the cleaning vehicle 1 to the planned path, there is an ultrasonic sensor 50 attached to front wall 2 and two ultrasonic sensors 51, 52 attached to side wall 3, the ultrasonic sensors 51 and 52 being arranged in the direction of the longitudinal axis of cleaning vehicle 1 at spaced intervals. Each of these ultrasonic sensors 50, 51 and 52 contains a conventional ultrasound emitter, which by way of illustration is arranged on the bottom of the upper sound channels 53, 55, 57 in such a way that sound channels 53, 55, 57 shape the emitted sound energy into a sound beam lobe as in the manner determined by the shape of the sound channel. The ultra-sonic receiver is thus at the bottom of sound channels 54, 56, 58 of ultrasonic sensors 50, 51, 52.

Figure 20:
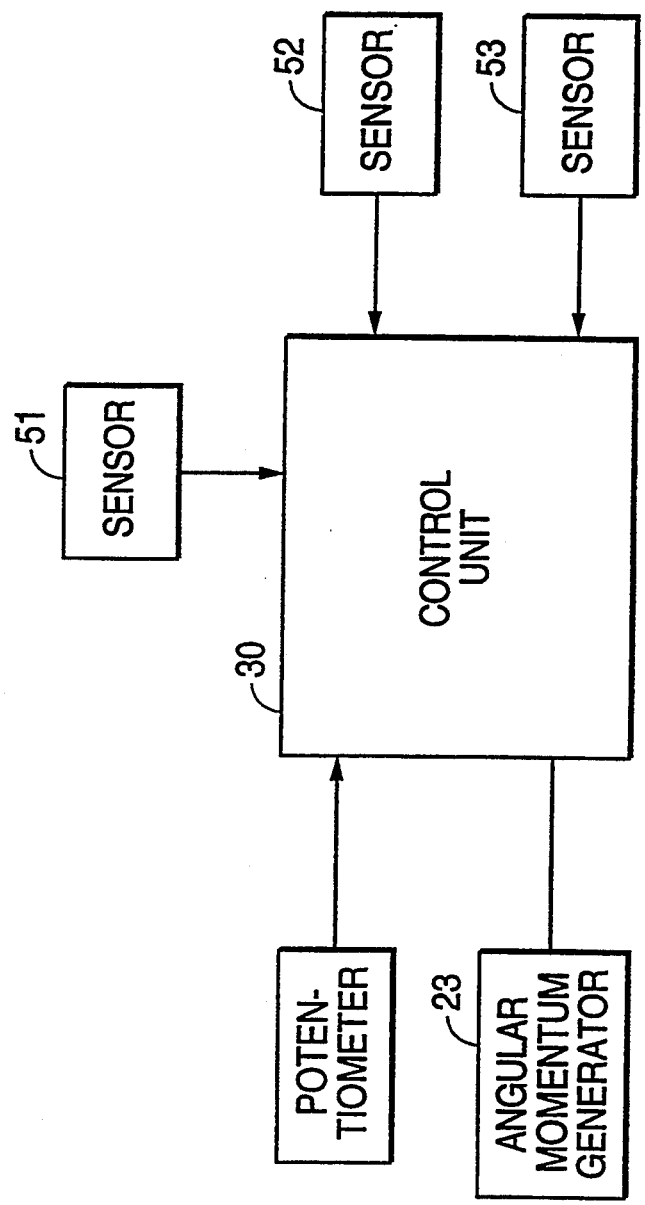
FIG. 20 illustrates in block diagram form the connections of the sensor units and the control units.

FIG. 20 illustrates diagrammatically the connection of the sensors 50, 51, 52 to the control unit 30, as well as the connection of the angular momentum generator 23 and potentiometer to the control unit 30. These connections of the sensors and the control unit are conventional and well known to those of ordinary skill in the art. Furthermore, one of ordinary skill in the art can readily program the control unit 30 according to the present invention given the below-described functionality.

Figure 10:
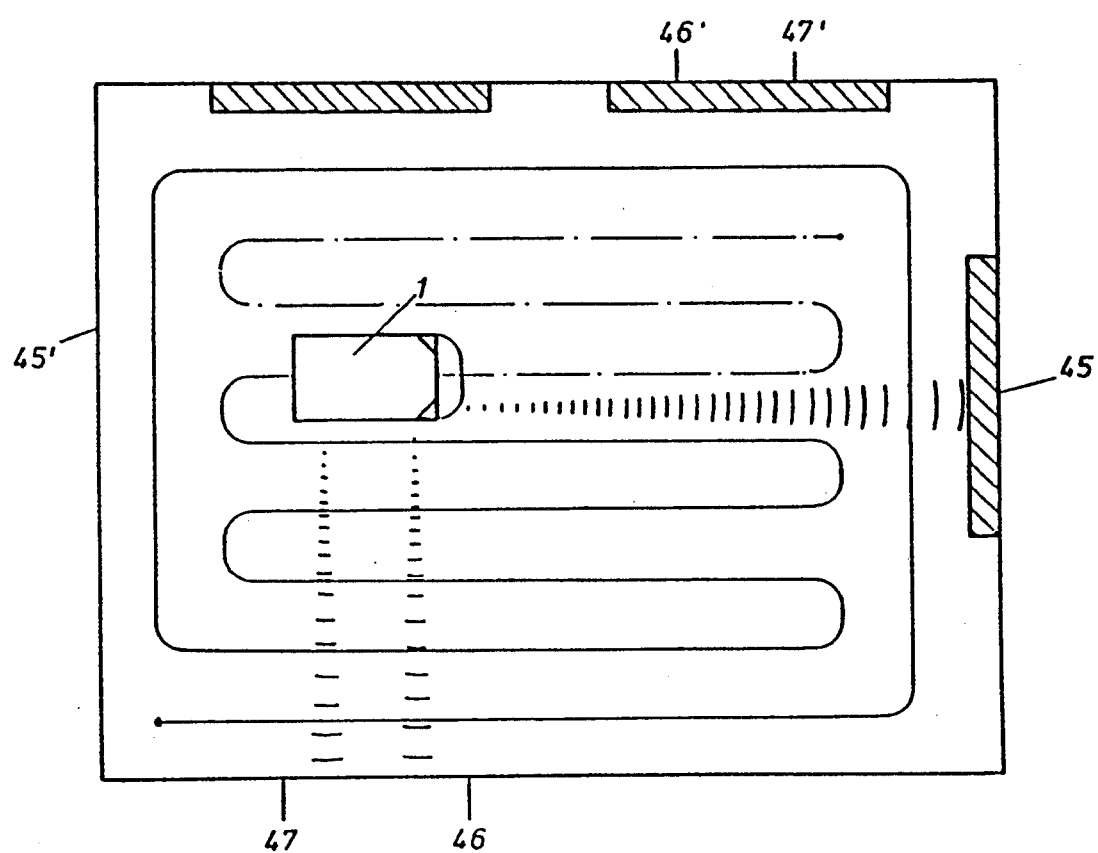
FIG. 10 depicts a diagrammatic top view of the cleaning vehicle at a point on a planned path while distances to the objects in the vicinage are being measured.

As indicated in FIG. 10, there are objects in the vicinage 45, 46, 47, 45', 46', 47', at various sites along the course of the planned path of cleaning vehicle 1, for example cabinets, walls, and the like, which are known and defined as to their position in the room and thereby in relation to the planned path and their position in relation to the planned path coordinates is stored in the steering and control unit 30. Thus, if the cleaning vehicle 1 reaches one of the planned path coordinates assigned to objects in the vicinage 45, 46 47, distance measuring ensues by means of ultrasonic sensors 50, 51, 52 in that pulse-like emissions of ultra-sound energy from the sound generator of ultrasonic sensor 50 are beamed at the object in the vicinage 45, for example a cabinet wall, and the reflected sound impulses reach the receiver of ultrasonic sensor 50 via sound channel 54. The time difference yields the distance of cleaning vehicle 1 to object in the vicinage 45 in the conventional manner.

Accordingly, ultrasonic sensors 51 and 52 determine the distance from the objects in the vicinage 46, 47, by way of illustration a protrusion from the wall.

The true position of cleaning vehicle 1 (actual position) in relation to the planned coordinates on the planned path can be easily ascertained in steering and control unit 30 from the distances of cleaning vehicle 1 from the objects in the vicinage 45, 46, 47, determined in the afore-described manner, whereby the angular position of cleaning vehicle 1 to the objects in the vicinage 46 and 47 can be determined by comparing the distances ascertained by sensors 51 and 52.

Moreover, the distance to the ceiling can also be measured by means of ultrasonic sensor 150, the sound channels 151 and 152 of which being arranged on the ceiling 5, in order by way of illustration to determine the presence of an edge of an overheadlamp, or the like, assigned to a point on the planned path.

On the basis of the information gained in this manner, the position and the alignment of the cleaning vehicle 1 can be corrected in such a way that it returns to the planned path in a defined manner. Thus, by way of illustration, when a deviation of the actual position of cleaning vehicle 1 from the planned path and/or a deviation of the alignment of cleaning vehicle 1 in relation to the course of the planned path is detected, steering and control unit 30 generates an appropriate steering movement of wheel 20 by means of which cleaning vehicle 1 is returned to the planned path, or realigned in relation to the planned path.

If the distance measurements indicate that cleaning vehicle 1 is correctly aligned on the planned path, but the presupposed planned coordinates on the planned path have, however, not yet been reached or have already been passed, the presupposed stored position of cleaning vehicle 1 on the planned path is corrected accordingly in steering and control unit 30. For example, following the correction, steering and control unit 30 proceeds from the actual position of cleaning vehicle 1 and steers it subsequently along the planned path until the position of cleaning vehicle 1 in relation to the planned path is rechecked with the aid of ultrasonic sensors 50, 51 and 52.

Figure 1:
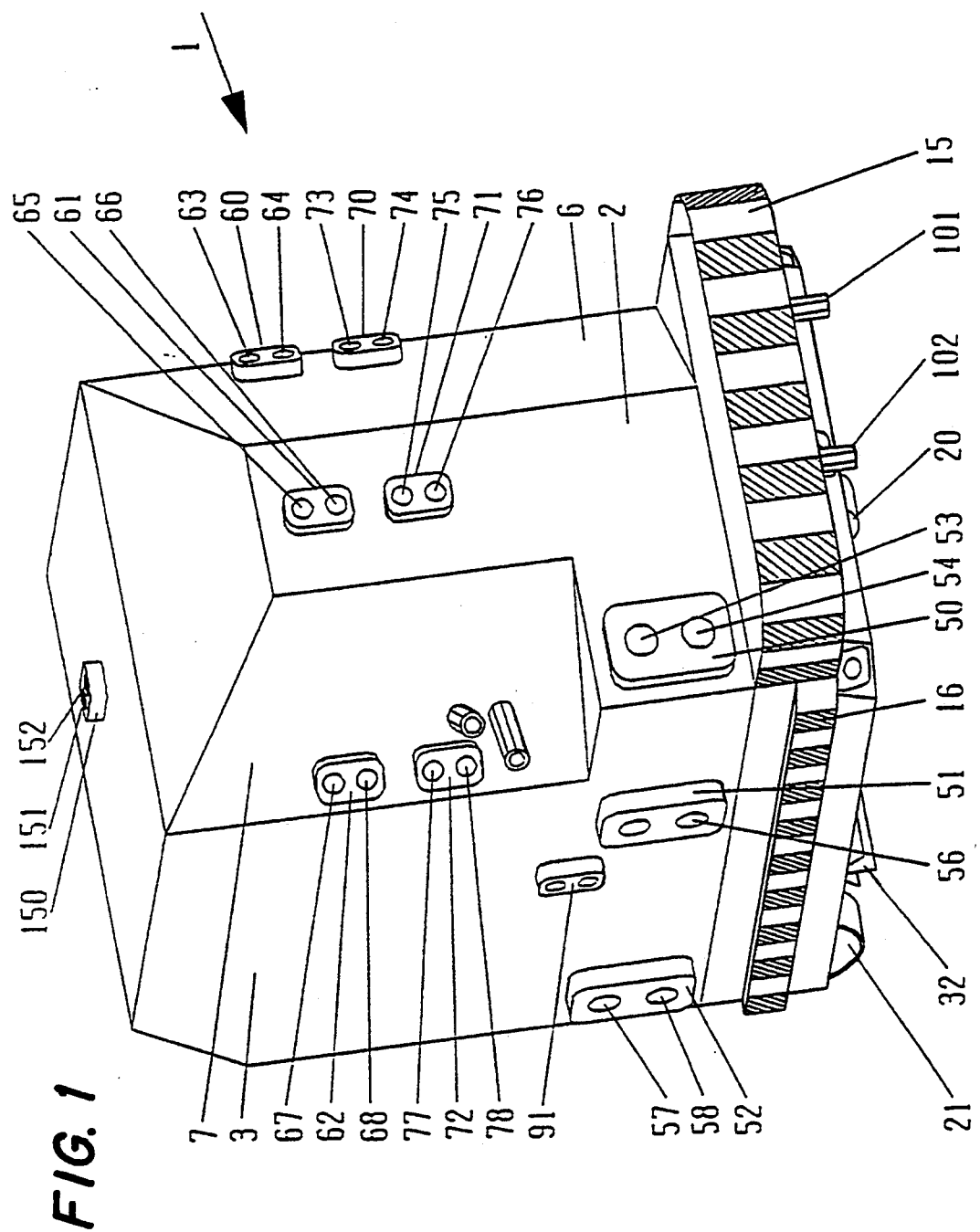
FIG. 1 depicts in a representation in perspective a view of an unmanned cleaning vehicle diagonally from the front.

As shown in FIG. 1, in the meandering course of the planned path of cleaning vehicle 1, the correction ensues expediently immediately after cleaning vehicle 1 has been steered in the opposite direction and/or immediately prior to such reversing.

In addition to ultrasonic sensors 50, 51, 52, and 150 for navigation, cleaning vehicle 1 is provided with other sensors and devices for collision prevention.

Figure 2:
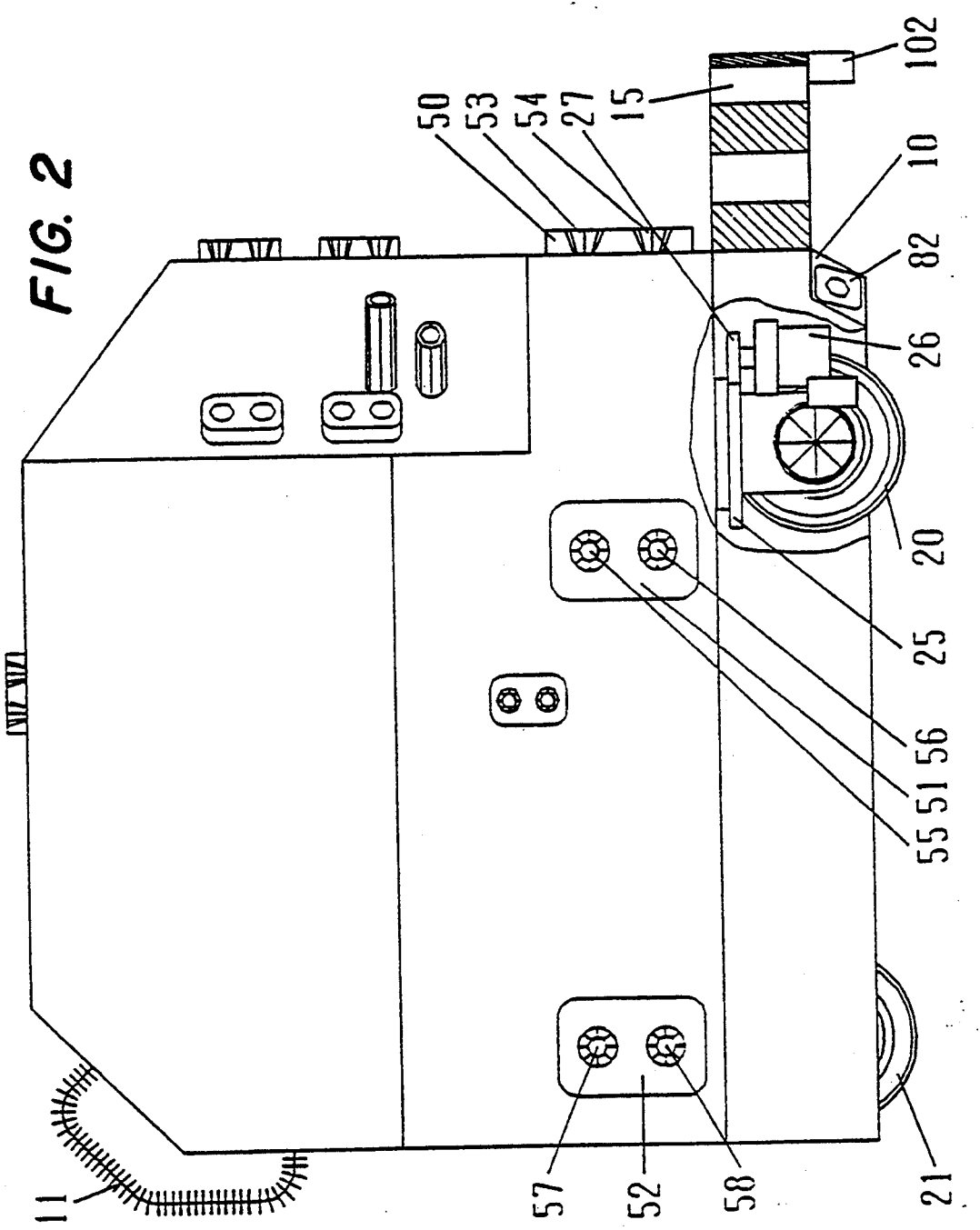
FIG. 2 depicts a lateral view of the cleaning vehicle of FIG. 1.
Figure 3:
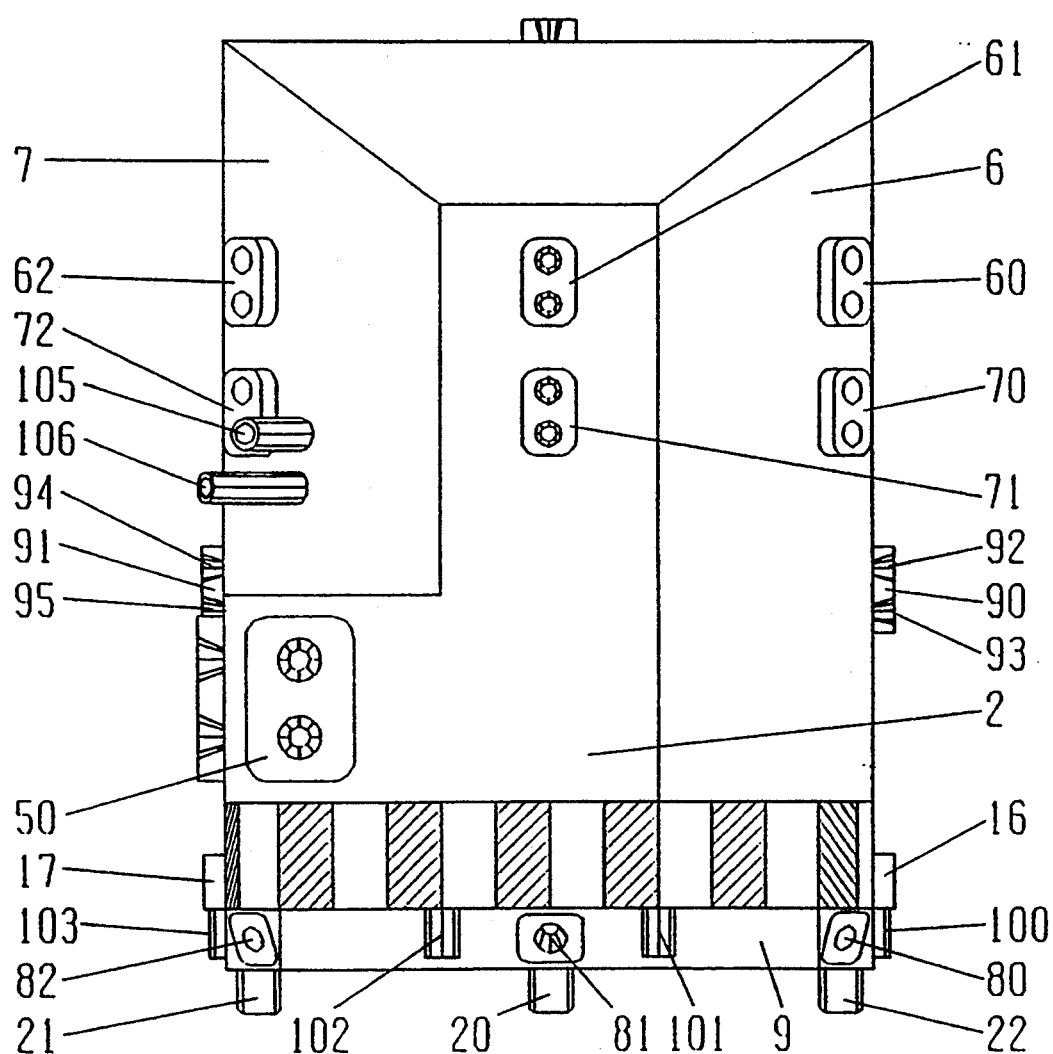
FIG. 3 depicts a front view of the cleaning vehicle of FIGS. 1 and 2.
Figure 4:
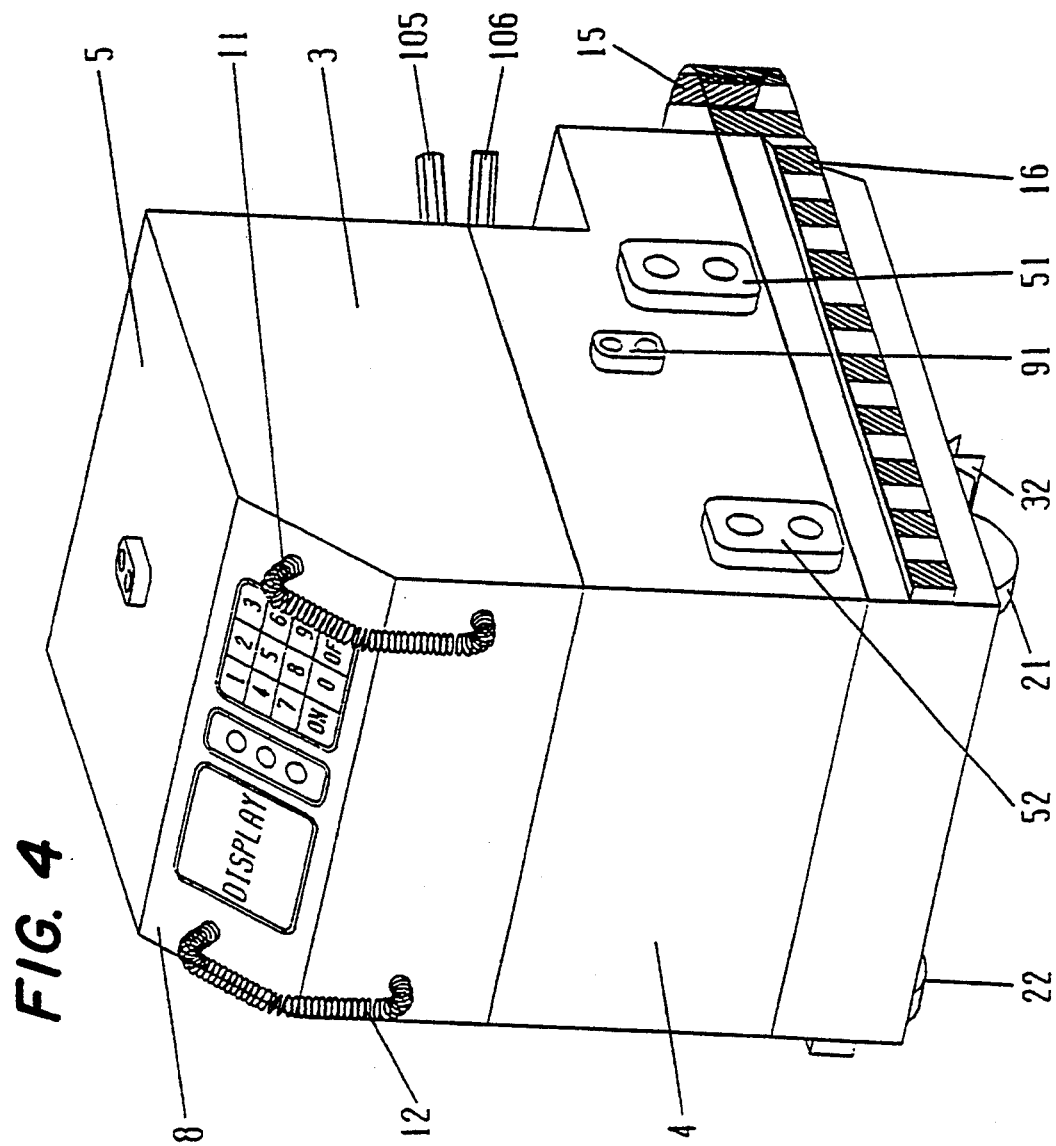
FIG. 4 depicts in a representation in perspective a view of the cleaning vehicle of FIGS. 1 to 3 diagonally from the rear.
Figure 5:
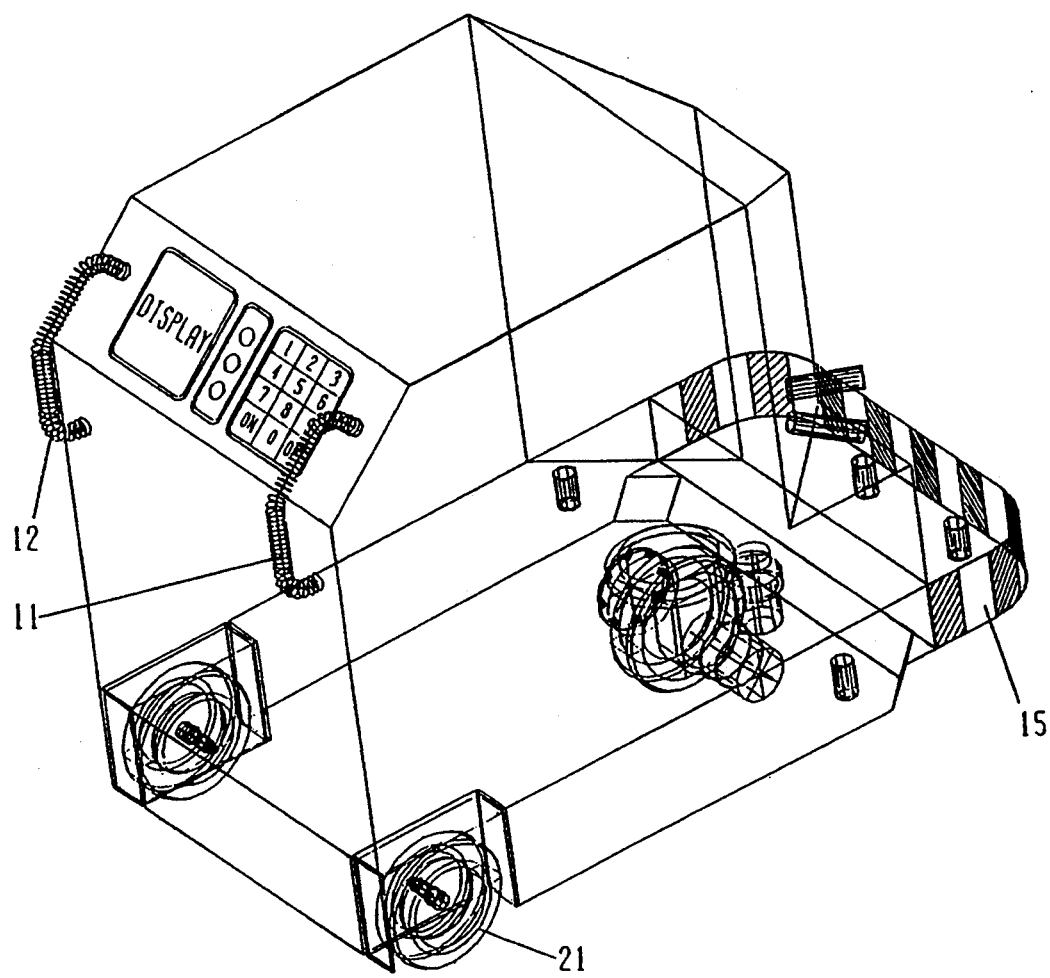
FIG. 5 depicts in a partially open representation corresponding to FIG. 4 parts of the cleaning vehicle in such a manner that the position of the wheels and of some sensors can be identified in the housing, whereby some parts have been omitted.

As can be seen in FIGS. 1 and 2, knock guard moldings 16 are mounted on the lower part of the side walls, of which only side wall 3 is depicted. On the front of cleaning vehicle 1, about at the level of knock guard moldings 16 and 17, there is a bumper 15 projecting forward around the housing of cleaning vehicle 1, as is customary in trucks.

Figure 7:
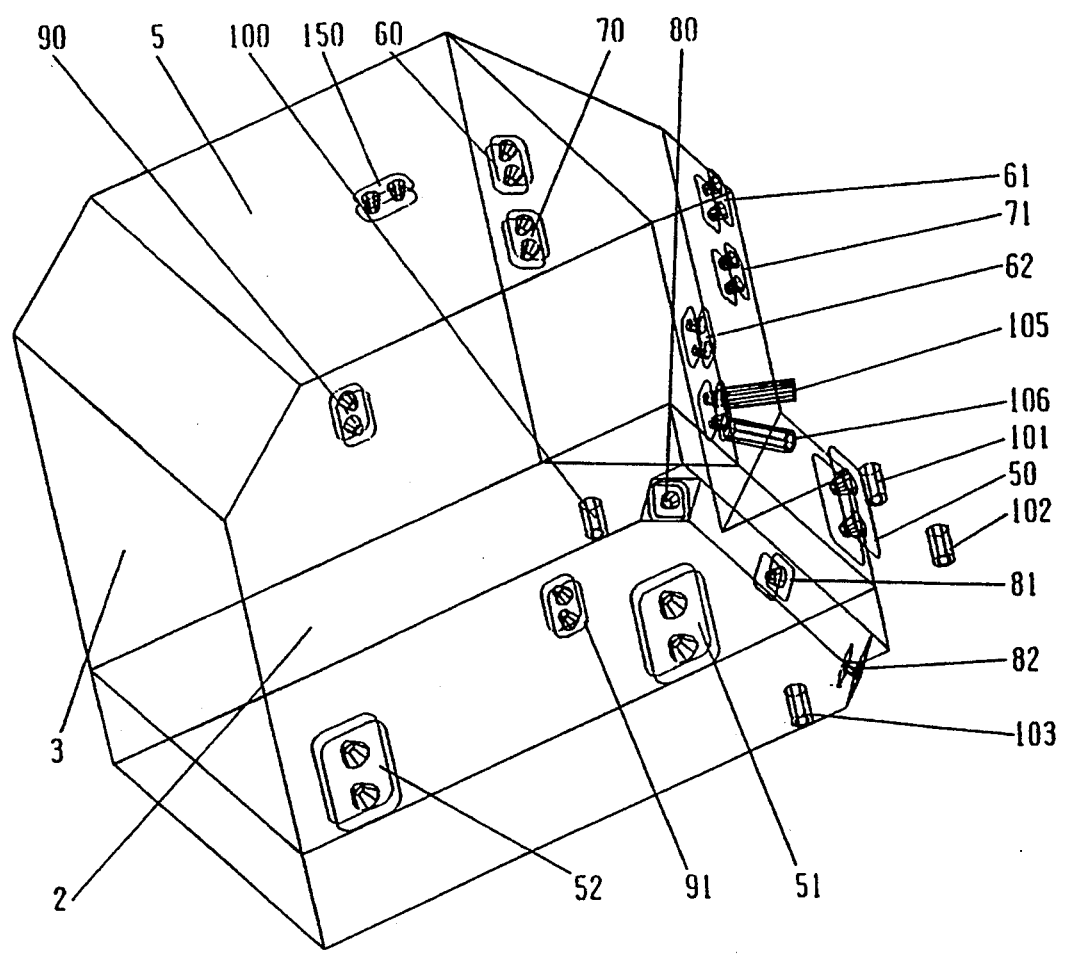
FIG. 7 depicts in a schematic diagram, in which the edges of the housing of the cleaning vehicle can be identified, the position of the various sensors on the housing.

Bumper 15 has infrared sensors 101 and 102 attached to it extending below it and corresponding sensors 100 and 103 are attached at the essentially same level to the front part of the side walls, the four infrared sensors 100, 101, 102, and 103 lying approximately in a semi-circle, as can be seen in FIG. 7. These infrared sensors ascertain the distance from the floor by means of their downward beaming infrared radiation and the reception of the reflected energy. If there is an increase in this distance beyond a prescribed limit, for example because one of the infrared sensors 100, 101, 102, 103 is over a lower step while wheels 20, 21, 22 of cleaning vehicle 1 are still supported on the floor above the step, the excessive difference in distance detected by the infrared sensor releases a signal which stops the operation of cleaning vehicle 1 and, under circumstances, releases an acoustical or optical signal to inform an operator. In this manner, it is ensured that the cleaning vehicle does not fall.

During the operation of cleaning vehicle 1, it can happen that obstacles appear in the distance ahead of the cleaning vehicle, which were not there when the planned path was entered, being, by way of illustration, objects that were brought into the room later or moved later or persons moving in the area of the planned path.

In order to monitor obstacles of this kind, there are two groups of ultrasonic sensors, 60, 61, 62 and 70, 71 72 on the housing of cleaning vehicle 1, of which ultrasonic sensors 61 and 71 are in the center of front wall 2 and ultrasonic sensors 60, 70 are attached to the connecting wall 6 joining the front wall 2 and the one side wall and aligned at an angle of approximately 45° to the front wall 2.

Figure 11:
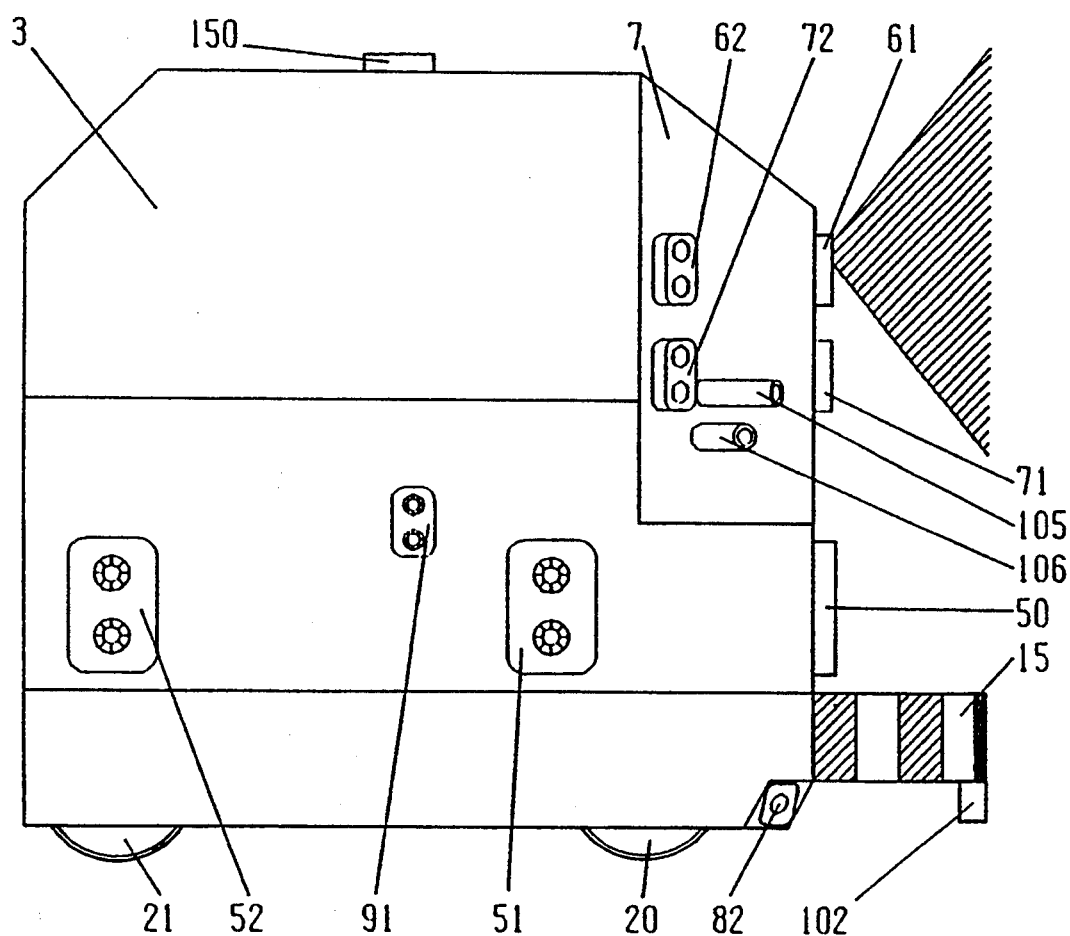
FIG. 11 depicts a lateral view of a sound field produced by an ultrasonic obstacle sensor.
Figure 12:
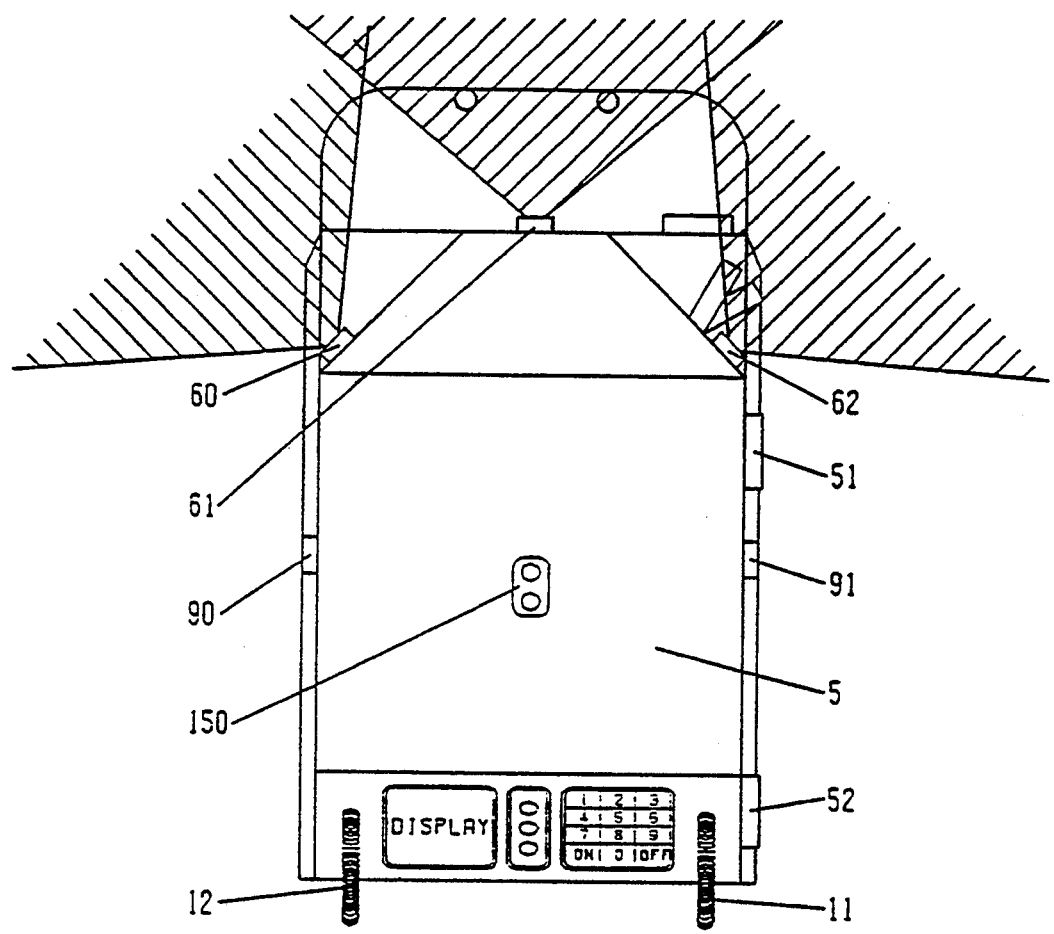
FIG. 12 depicts in a diagrammatic top view the shape of the sound field produced by the ultrasonic obstacle sensor of FIG. 11 and the corresponding ultrasonic obstacle sensors.

Ultrasonic sensors 60, 61, 62 have sound channels 63, 65 67 on the bottom of which the sound generators are arranged and which shape the emitted sound into sound beam lobes in such a manner that an area of approximately 180° overlapping sound field evenly distributed above and below a horizontal plane is yielded, as is illustrated in FIGS. 11 and 12.

The reflected sound is caught by sound channels 64, 66, 68 and led to the respective receiver device assigned to the sound generator in such a way that the distance from an object appearing in front of cleaning vehicle 1 can be detected by means of the difference in time between the emitted and received sound. In this manner, the cleaning vehicle can be stopped in time and, however, also steered in such a way that it either drives around the obstacle or reverses direction.

Figure 13:
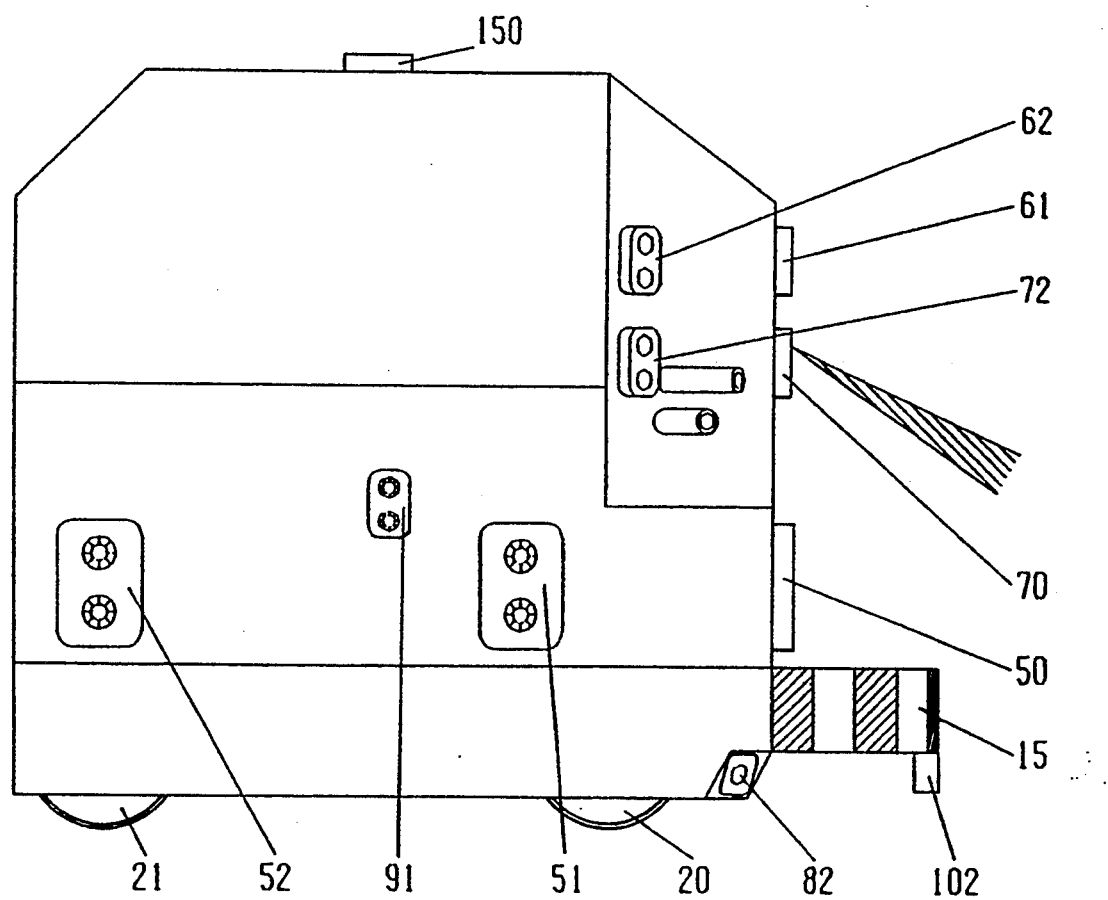
FIG. 13 depicts in a lateral view a sound field produced by another ultrasonic obstacle sensor.
Figure 14:
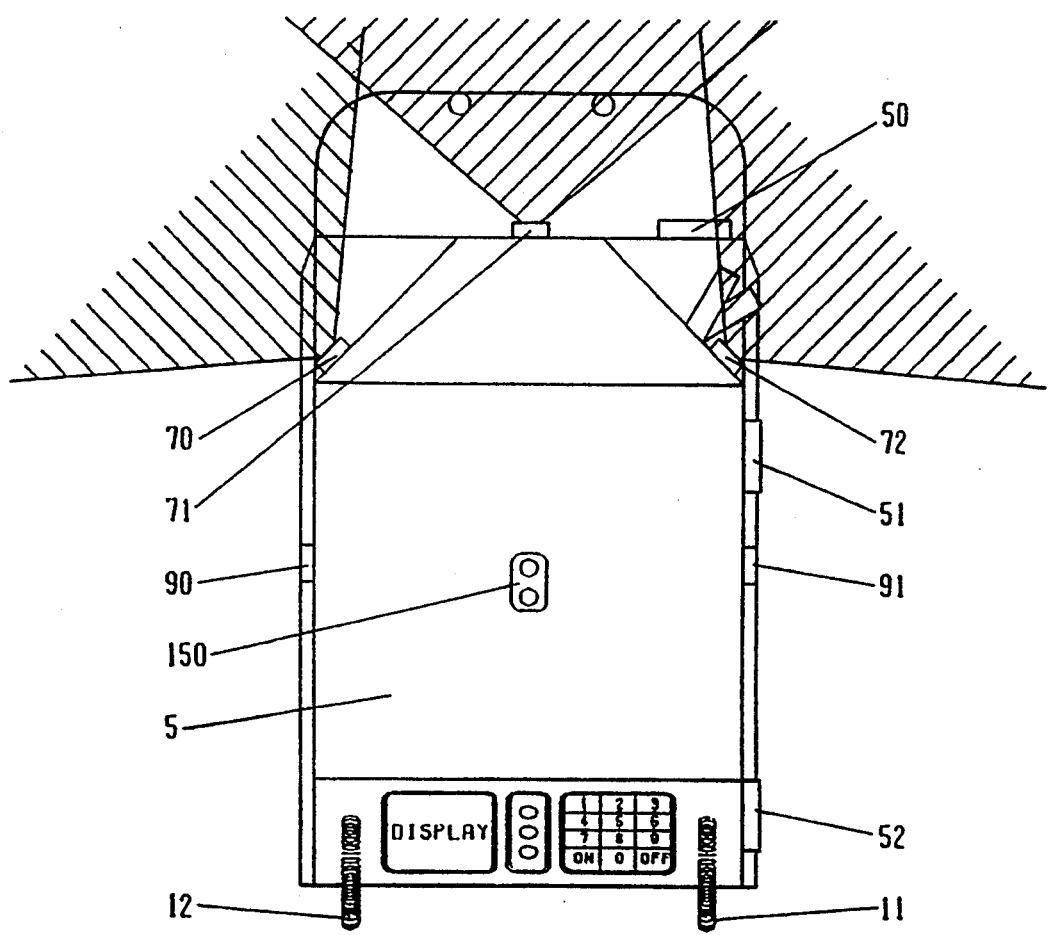
FIG. 14 depicts in a diagrammatic top view the shape of the sound field produced by the ultrasonic obstacle sensor of FIG. 13 and the corresponding ultrasonic obstacle sensors.

As "medium high" obstacles cannot always be positively identified with the aid of the ultrasonic sensors 60, 61, 62, ultrasonic sensors 70, 71 and 72 produce a sound field aimed diagonally downward covering the entire area in front of cleaning vehicle 1 by means of the emission of sound energy through their sound channels 73, 75, 77, as is depicted in FIGS. 13 and 14, so that in this way the sound energy reflected from low objects can be caught and assessed via sound channels 74, 76, 78.

Figure 15:
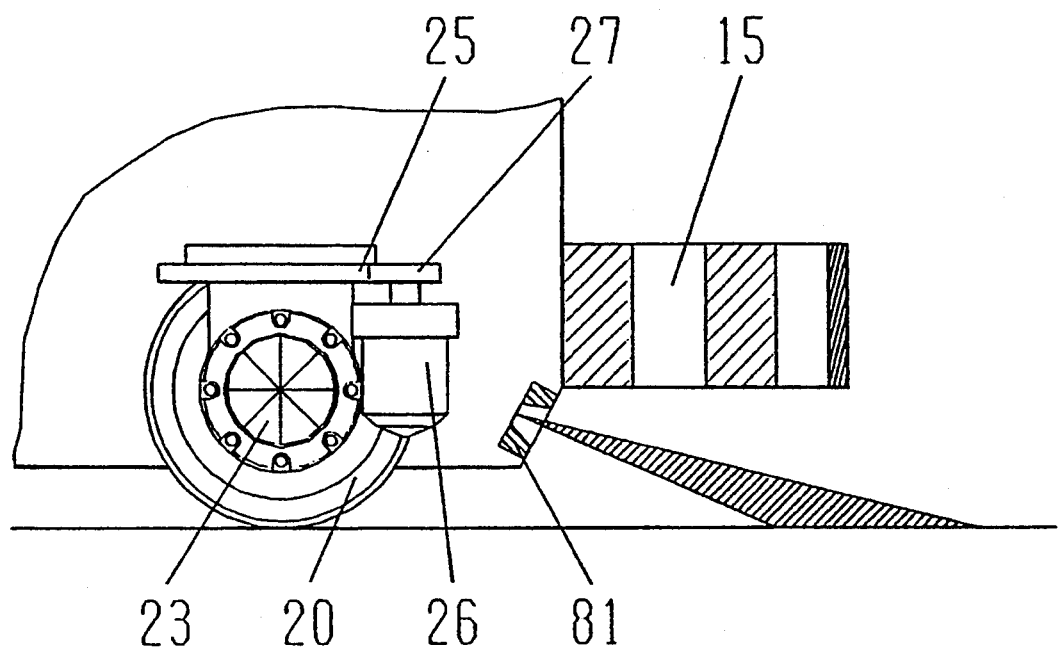
FIG. 15 depicts in a sectional lateral view a sound field produced by an ultrasonic obstacle sensor for very low obstacles.
Figure 16:
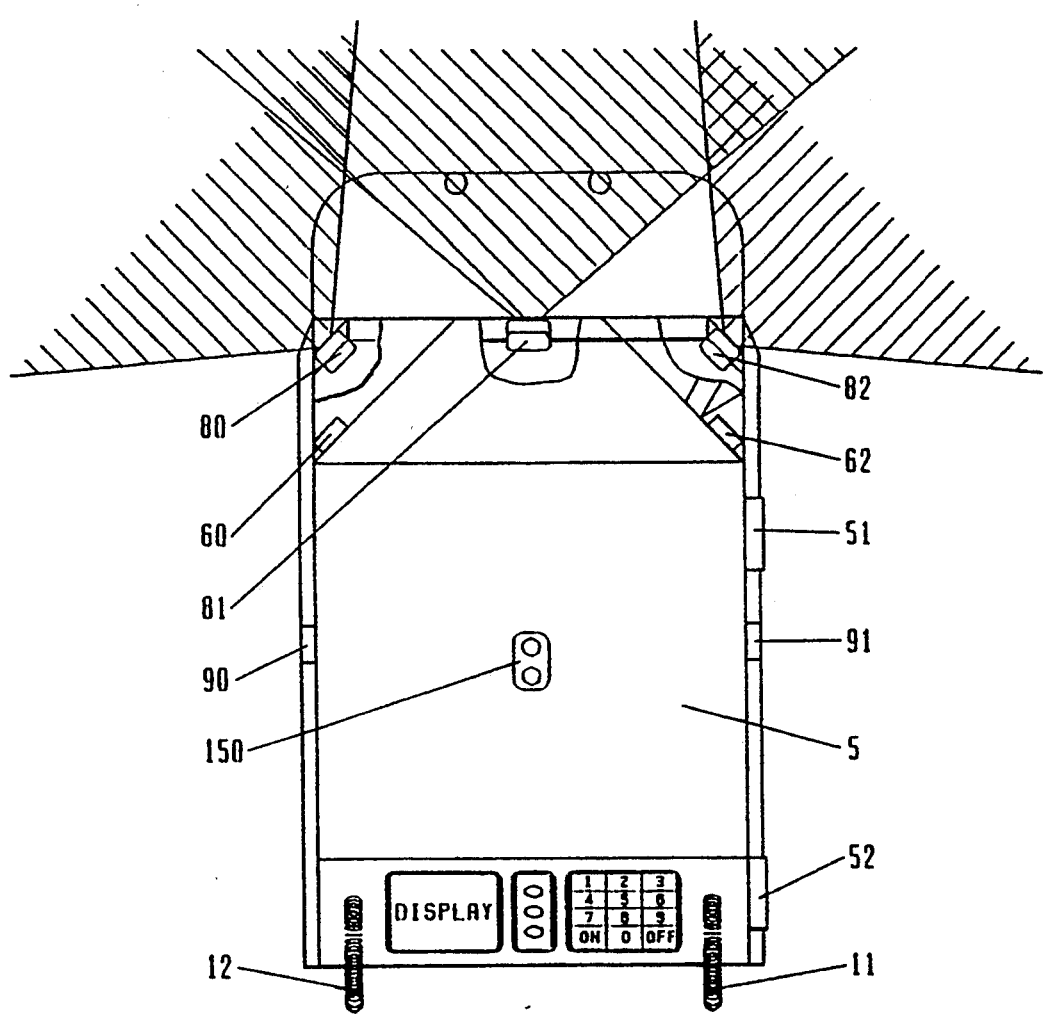
FIG. 16 depicts in a diagrammatic top view the shape of the sound field produced by the ultrasonic obstacle sensor of FIG. 15 and the corresponding ultrasonic obstacle sensors.

In order to be able to identify especially low obstacles, like by way of illustration door stoppers, ultrasonic sensors 80, 81, 82, producing a sound field according to FIGS. 15 and 16, are attached to the housing of cleaning vehicle 1 below the bumper 15.

In this connection it is to be noted that the ultrasonic sensors on cleaning vehicle 1 work in pulse operation and are activated in succession in a controlled manner so that each ultrasonic sensor emits a sound impulse and is able to receive and assess its reflected energy, whereupon this ultrasonic sensor is deactivated and the next ultrasonic sensor is activated. In this way, it is ensured that an ultrasonic sensor does not receive and assess the energy emitted from another ultrasonic sensor and reflected from the environs. For this reason, a single sound channel can be provided like the one shown with ultrasonic sensors 80, 81 and 82, through which the ultrasonic energy from the sound generator is first emitted in the form of a impulse and subsequently the reflected sound energy is received and led to the assessment device.

In order to identify obstacles appearing laterally, there is in addition an ultrasonic sensor 90, 91 having a sound channel 92, respectively 94 for the emitted ultrasound and a sound channel 93, respectively 95, for the reception of the reflected sound energy, attached to each side wall of the housing of cleaning vehicle 1.

In addition to the above-described ultrasonic sensors, there are two infrared sensors 105, 106 aimed diagonally forward arranged on the connecting wall 7, infrared sensor 105 being pitched at an angle of approximately 30° and infrared sensor 106 being pitched at an angle of 60° to the longitudial axis of cleaning vehicle 1. By means of these infrared sensors, the appearance of lateral obstacles is additionally monitored in order, if need be, to be able to brake or steer the cleaning vehicle accordingly, whereby the detection of an obstacle by means of the infrared sensor 106 leads to an emergency braking if this obstacle is within the dangerously minimal distance from cleaning vehicle 1.

In order to perform cleaning work, cleaning vehicle 1 is provided with essentially roll-shaped cleaning brushes 32, which have contact with the floor in operation and which are driven via an infinite belt 34 by an electric engine 33, which is only illustrated diagrammatically. Electric engine 33 is mounted on a covering housing 35, which is provided with a sheet pointed diagonally downward onto which the cleaning brush 32 flings the dirt accumulated from the floor and from which the vacuum hose 36 stretches upward to a dirt collecting chamber 37. Under dirt collecting chamber 37 is a fan 38, which generates under-pressure via a not-depicted filter arrangement in dirt collection chamber 37. This fan is driven by an electric engine 39.

Other types of cleaning aggregates may, of course, be attached to cleaning vehicle 1, like the one known for floor cleaning machines.

Figure 17:
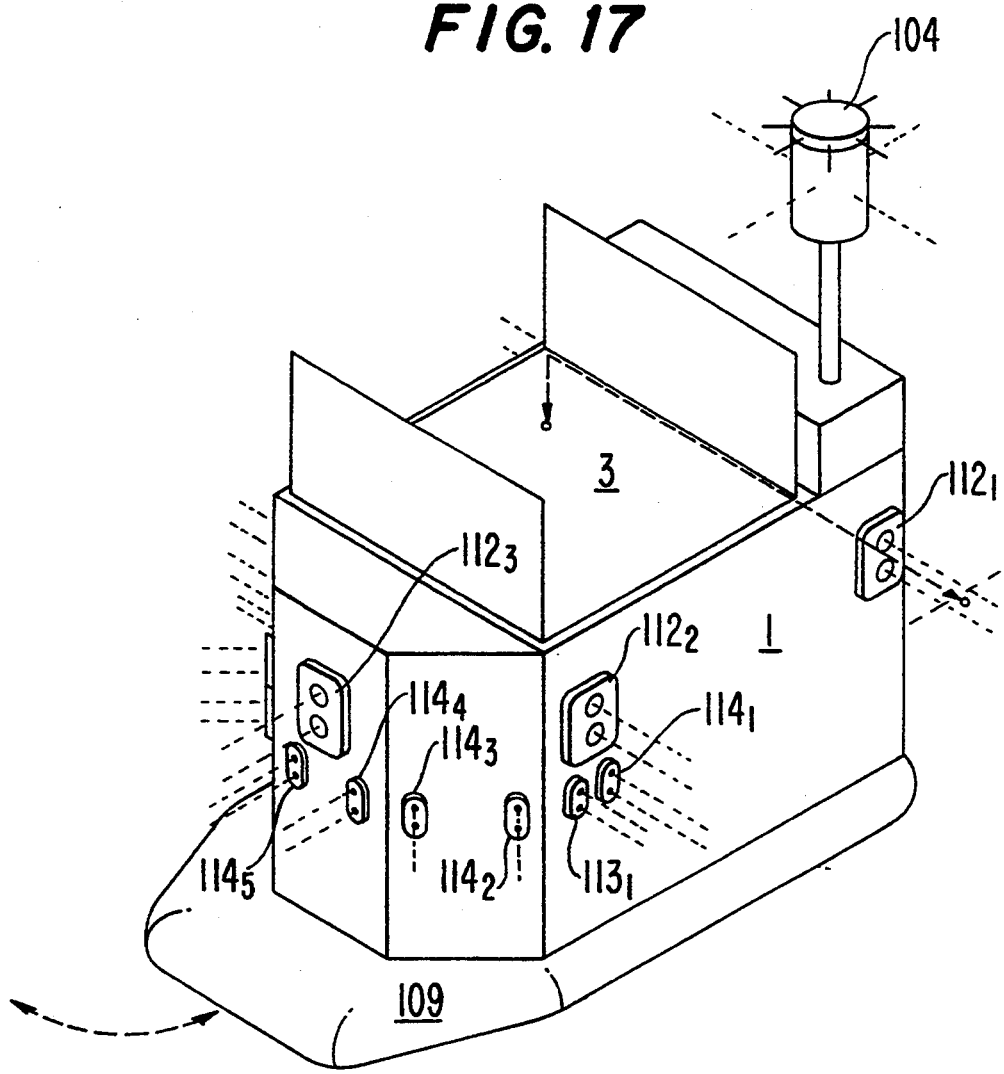
FIG. 17 depicts in a representation in perspective a view of an unmanned truck diagonally from the front.

FIG. 17 shows an invented vehicle utilized as a truck. This vehicle is designed similarly to the cleaning vehicle described in connection with FIGS. 1 to 9, therefore the following description can be brief.

The invented truck is provided with a steering and control unit, not illustrated in detail, in the same manner as the above-described cleaning vehicle, controlling the steering movements and the drive of the wheels of the vehicle, and with a safety bumper 109 for immediate touching, which, however,—as will be explained later—only becomes active when an object enters the immediate area of vehicle 1 with rapid movements.

The truck in FIG. 1 is provided with first sensors like the cleaning vehicle in FIG. 17, although not depicted, which ascertain the number of revolutions of the wheels and their steered angle. Furthermore, on the exterior of the vehicle are provided second sensors $112_1$ to $112_5$, third sensors $113_1$ and $113_2$ and obstacle sensors $114_1$ to $114_8$.

Of the second sensors $112_1$ to $112_5$ two are attached to the longitudinal sides of the vehicle spaced at intervals in the direction of the longitudinal axis and one to the front of the vehicle. Each of the sensors has an ultra-sound emitter and an ultra-sound receiver permitting a distance measurement in relation to a stationary surface according to the travelling time and the design of which is described in connection with FIG. 19.

The third sensors $113_1$ and $113_2$ comprise opto-electronic distance sensors, by way of illustration sensors of the type designation 105 022 from the firm Fa. Grieshaber, one sensor each being mounted on the outside on the front edge on the longitudinal side of the vehicle and facing outward vertically to the travelling axis.

The obstacle sensors $114_1$ to $114_8$ comprise ultrasonic sensors, having a wide sound beam lobe at least in the plane parallel to the floor. Their design may, in particular, correspond to the design of obstacle sensors as already described in connection with FIGS. 11 to 16.

Furthermore, the vehicle is provided in an as such known manner with a loading station and a warning light 104 for malfunctions.

Figure 18:
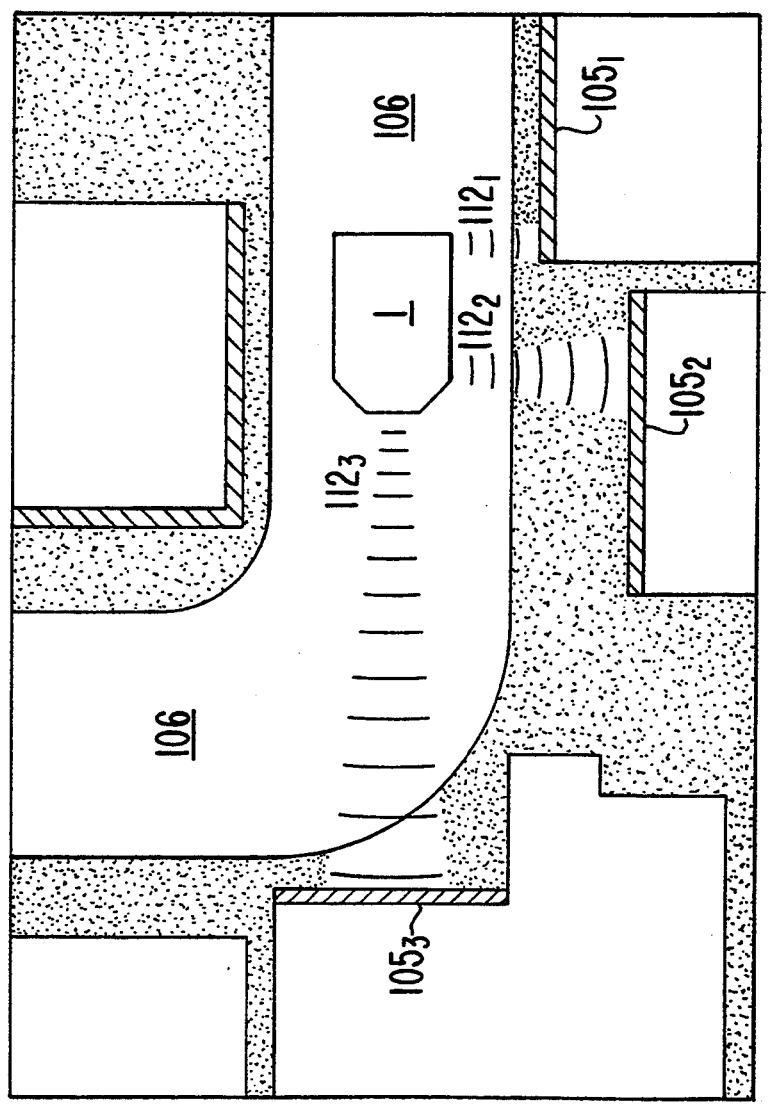
FIG. 18 depicts a top view of an invented truck in exemplary surroundings.

FIG. 18 shows diagrammatically a navigational principle of the invented vehicle 1. The second sensors $112_1$ to $112_3$ measure the distance from the reference surfaces $105_1$, $105_2$ and $105_3$, the position of which in relation to the travelled course 106 is permanently stored in the steering and control unit of the vehicle. From the ascertained distance values, the steering and control unit is able to determine the actual position of the vehicle at a specific point in time and compare it with the position, which it computed by means of "integration" of the output signals of the first sensors. In the event of a deviation of the actual position from the computed position, the steering and control unit can induct the appropriate corrective movements when the deviation is too great, making exact course determination impossible, the steering and control unit can release a call for the operator.

Figure 19:
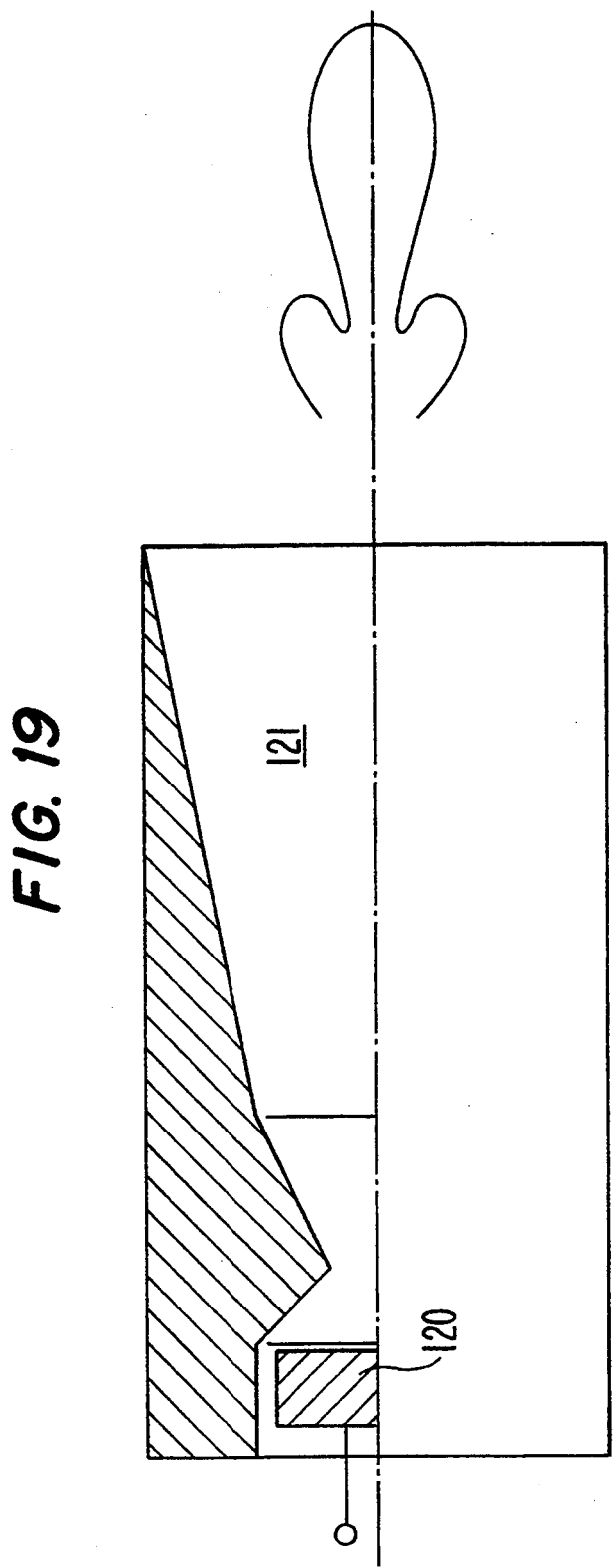
FIG. 19 depicts an embodiment of an ultrasonic used as a second sensor.

FIG. 19 shows a modification of a conventional ultra-sound emitter 120 with a sound channel 121, which permits a modification of the sound beam lobe of the ultra-sound emitter. By means of the sound channel illustrated in the figure by means of a cross-section, corresponding approximately to two inverse funnels, a sound beam lobe is yielded, as depicted in FIG. 19, in which the ultra-sound bundle is focussed to $\pm 5°$ (at a value of -3 dB). This design of the sound beam lobe is especially suited for distance measurement of surfaces that are far away.

Moreover, with regard to the design of the sound beam lobe express reference is made to the representation in FIG. 19.

In the foregoing the present invention is described using preferred embodiments without the intention of limiting the scope of the overall inventive concept, within which there are, of course, many very varied possible modifications and alterations.

It is particularly advantageous if, by means of a multiplex operation, not described in detail herein, only one sensor or a group of sensors is homed at one time so that overlapping of the reflected sound waves is avoided, thereby resulting in the additional advantage that only one homing unit is required for a great number of sensors, as by means of invented design of actual ultra-sound emitter and receiver all the sensors are built the same. Nonetheless, most varied emission characteristics can be attained with the above-described sound channels provided in accordance with the present invention.

At any rate, however, an unmanned vehicle is gained permitting navigating without guidelines on practically freely predeterminable and easily altered courses.

Such a vehicle can be employed not just as an automatic truck, but also as a surveillance vehicle for security service, for military purposes, as well as for maintenance cleaning of buildings, squares, the care of sport grounds as well as for agricultural tasks, whereby it is possible to steer—as described—the vehicle in relation to paths as well as surfaces.

Furthermore, there is the additional advantage that the invented vehicle can be positioned so precisely that it is possible to transfer, by way of illustration, standard plastic containers of the format 600×400 mm at purely passive transfer stations by means of special load transfer modules. In this manner, by way of illustration, printed wiring board magazines, printing plates, etc. can be transported.

The cost of the vehicle is further reduced as transferring loads is facillitated due to the positioning precision of the invented vehicle and only passive transfer stations are required.

What is claimed is:

1. An unmanned vehicle, comprising:
a control unit which controls a steer angle and revolutions of at least one wheel of the vehicle, and in which a freely determinable path to be travelled by the vehicle as well as positions of objects in a vicinity of the area of the path are stored in memory;
a first sensor unit coupled to the control unit, said first sensor unit sensing a path covered by the vehicle and the direction of the covered path, the output signal of the first sensor unit being fed to the control unit;
a second sensor unit coupled to the control unit, the second sensor being used as a data correction gathering mechanism, the output signals of the second sensor unit being fed to the control unit, the second sensor unit having at least three sensors which measure distances between the vehicle and objects in the area of the path, one of said sensors measuring a corresponding first distance in the direction of the longitudinal axis of the vehicle, and the other two of said sensors measuring second and third distances to objects in the vicinity of the area of the path in the direction of the transverse axis of the vehicle, whereby the second and third distances which are offset in the direction of the longitudinal axis of the vehicle are measured to one object in the vicinity of the path;
wherein the control unit compares at least the second and third distances measured by the second sensor unit with expected distances to the stored position of the objects in the vicinity of an expected position and a desired alignment of the vehicle based on the output signals of the first sensor unit and corrects the actual position and the actual alignment of the vehicle at at least one of predeterminable time intervals and at certain points of the path based on the comparison.

2. A vehicle according to claim 1, wherein the second sensors are arranged to measure distances to smooth surfaces existing in the area of the course, to edges and ceiling projections.

3. A vehicle according to claim 2, wherein the control unit carries out correcting driving movements when the actual position or actual alignment deviates from the desired position or desired alignment.

4. A vehicle according to claim 1, wherein the control unit changes a desired-course coordinate corresponding to a determined actual position of the vehicle when the determined actual position is situated on a given course but deviates from a desired position, and the alignment of the vehicle is proper in relation to a desired path.

5. A vehicle according to claim 4, wherein the control unit compares an expected distance with the distance measured to the objects in the vicinity of the path when, on the basis of the position determined from the output signals of the first sensor, an object in the vicinity of the path whose position is stored is reached or when the vehicle is to perform a change of direction.

6. A vehicle according to claim 5, wherein the sensors of the second sensor unit are distance-measuring ultrasonic sensors.

7. A vehicle according to claim 6, wherein at least two of said sensors of the second sensor units are offset in the direction of the longitudinal axis of the vehicle and are arranged on each vehicle side.

8. A vehicle according to claim 7, wherein two of said sensors of the second sensor units are mounted on a same vehicle side and measure distances of the vehicle from the same object in the vicinity of the path in the direction of the transverse axis of the vehicle.

9. A vehicle according to claim 8, wherein the second sensor unit further includes at least one sensor directed to a ceiling of a room.

10. A vehicle according to claim 9, wherein the control unit, for the measuring of the distances offset in the direction of the longitudinal axis of the vehicle to objects in the vicinity of the path in the direction of the transverse axis of the vehicle, repeats the measurement of the distance to one object in the vicinity of the area of the path, the position of said object being stored, after a defined travelling course of the vehicle.

11. A vehicle according to claim 10, wherein the first sensor unit has a pulse generator coupled with at least one wheel.

12. A vehicle according to claim 11, wherein the first sensor unit has a sensor which senses the steer angle of at least one wheel.

13. A vehicle according to claim 12, further comprising a further sensor that provides an output signal from which the control unit determines the position of the vehicle relative to a stop.

14. A vehicle according to claim 13, wherein said further sensor is an optical distance sensor which, for the determination of the position of the vehicle relative to a stop, senses the position of a rectangular edge of a flat surface at short time intervals.

15. A vehicle according to claim 14, wherein the vehicle during position sensing when approaching a station travels in a straight line and a distance measurement takes place approximately each millimeter of travelling path.

16. A vehicle according to claim 15, further comprising a plurality of obstacle sensors coupled to the control unit.

17. A vehicle according to claim 16, further comprising crash monitoring sensors provided in the front area of the vehicle on a circular arc and which are directed vertically downward, the crash monitoring sensors being coupled to the control unit.

18. A vehicle according to claim 17, wherein the crash monitoring sensors are infrared sensors.

19. A vehicle according to claim 17, further comprising, at least on a front side and in a front side area of the vehicle, ultrasonic obstacle sensors, coupled to the control unit, having sound lobes which are shaped by sound channels connected in front of the obstacle sensors such that at least one sound field is formed which completely covers an area to be monitored.

20. A vehicle according to claim 19, wherein three of said ultrasonic obstacle sensors produce a sound field completely covering the area to be monitored, said sound field being symmetrical to a horizontal plane propagating in the same manner above and below the plane.

21. A vehicle according to claim 20, wherein at least one group of three of said ultrasonic obstacle sensors produce a sound field aimed diagonally forward and downward completely covering an area to be monitored.

22. A vehicle according to claim 19, further comprising two optical obstacle sensors, coupled to the control unit, provided in the area of a lateral front edge of the vehicle, one of said optical obstacle sensors beaming at an angle of from 15° to 40° with respect to the longitudinal axis of the vehicle, and the other of said optical obstacle sensors beaming at an angle of from 50° to 70° with respect to the longitudinal axis of the vehicle toward the front.

23. A vehicle according to claim 16, wherein the control unit stops the vehicle when one of the obstacle sensors senses an obstacle in the travelling path of the vehicle.

24. A vehicle according to claim 16, wherein the control unit initiates an evading movement of the vehicle when the control unit senses an obstacle in the travelling path of the vehicle.

25. A vehicle according to claim 16, wherein the second sensors of the second sensor units and the obstacle sensors have essentially identical ultrasound emitters, the beaming characteristic of which is affected by sound channels.

26. A vehicle according to claim 25, wherein said sound channels, which focus an ultra-sound bundle to ±5°, are mounted on the vehicle in front of the ultra-sound emitters of the second sensors of the second sensor units.

27. A vehicle according to claim 25, wherein said sound channels, which focus an ultra-sound bundle to ±5°, in a plane perpendicular to the floor and to ±30° in a plane parallel to the floor, are mounted on the vehicle in front of the ultra-sound emitters of the obstacle sensors.

28. A vehicle according to claim 16, wherein the obstacle sensors send signals to the control unit for providing additional information regarding navigation in the area close to the wall.

29. A vehicle according to claim 1, wherein program data of a new travelling course is stored in said memory of the control unit off-line interactively with a personal computer, with the program data being transferrable at a station or by teletransmission to the control unit of the vehicle.

30. A vehicle according to claim 1, wherein the vehicle is a cleaning vehicle.

31. A vehicle according to claim 30, further comprising a cleaning brush on the bottom of said vehicle having a vacuum device arranged above it.

32. A vehicle according to claim 29, wherein the vehicle is an industrial truck.

* * * * *